US012128264B2

(12) United States Patent
Multer et al.

(10) Patent No.: US 12,128,264 B2
(45) Date of Patent: *Oct. 29, 2024

(54) IN-RACK FIRE PROTECTION SPRINKLER SYSTEM INCLUDING AT LEAST ONE UNITARY HORIZONTAL BARRIER THAT COVERS RACKS OF ADJOINING RACKS AND AT LEAST ONE RACK LEVEL FIRE PROTECTION SPRINKLER DISPOSED BELOW THE AT LEAST ONE HORIZONTAL BARRIER

(71) Applicant: The Reliable Automatic Sprinkler Co. Inc., Liberty, SC (US)

(72) Inventors: Thomas Multer, Liberty, SC (US); Oliver Pahila, Liberty, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,370

(22) Filed: Sep. 8, 2023

(65) Prior Publication Data

US 2024/0001181 A1 Jan. 4, 2024

Related U.S. Application Data

(60) Continuation of application No. 18/151,565, filed on Jan. 9, 2023, now Pat. No. 11,786,767, which is a (Continued)

(51) Int. Cl.

*A62C 3/00* (2006.01)
*A62C 3/06* (2006.01)

(Continued)

(52) U.S. Cl.

CPC ................ *A62C 3/002* (2013.01); *A62C 3/06* (2013.01); *A62C 35/58* (2013.01); *A62C 35/68* (2013.01)

(58) Field of Classification Search

CPC ........... A62C 3/002; A62C 3/06; A62C 35/58; A62C 35/68

See application file for complete search history.

(56) References Cited

U.S. PATENT DOCUMENTS

| | | | |
|---|---|---|---|
| 3,520,345 | A | 7/1970 | Lillibridge et al. |
| 3,539,108 | A | 11/1970 | Lillibridge et al. |

(Continued)

FOREIGN PATENT DOCUMENTS

| | | | |
|---|---|---|---|
| CN | 101553285 | A | 10/2009 |
| CN | 101951993 | A | 1/2011 |

(Continued)

OTHER PUBLICATIONS

Notification of and International Search and the Written Opinion of the International Searching Authority, mailed Jan. 24, 2014, in corresponding International Patent Application No. PCT/US2013/054213.

(Continued)

*Primary Examiner* — Tuongminh N Pham
(74) *Attorney, Agent, or Firm* — Venable LLP

(57) ABSTRACT

A fire protection sprinkler system includes a horizontal barrier that covers two adjacent racks, and the vertical flue space between the racks. The horizontal barrier is provided at a predetermined height, and has a width that is at least equal to a width of the rack, and a depth that is at least equal to a sum of a depth of the rack, a depth of the other rack, and a depth of the vertical flue space. In addition, the horizontal barrier is a sheet having one or more apertures. The system also includes a rack level fire protection sprinkler connected to a fluid supply conduit, and being disposed in the vertical flue space below the horizontal barrier. The rack level sprinkler has a K-factor of 11.2 gpm/(psi)$^{1/2}$ or greater, and (Continued)

is vertically spaced from commodities stored on the rack and the other rack covered by the horizontal barrier.

28 Claims, 19 Drawing Sheets

Related U.S. Application Data continuation of application No. 16/520,474, filed on Jul. 24, 2019, now Pat. No. 11,571,593, which is a continuation of application No. 15/446,722, filed on Mar. 1, 2017, now Pat. No. 10,369,391, which is a division of application No. 14/379,483, filed as application No. PCT/US2013/054213 on Aug. 8, 2013, now Pat. No. 10,272,274.

(60) Provisional application No. 61/709,714, filed on Oct. 4, 2012, provisional application No. 61/681,999, filed on Aug. 10, 2012.

(51) Int. Cl.
*A62C 35/58* (2006.01)
*A62C 35/68* (2006.01)

(56) References Cited

U.S. PATENT DOCUMENTS

| | | | | |
|---|---|---|---|---|
| 3,727,694 | A * | 4/1973 | Dudzik .................. | A62C 3/002 169/54 |
| 3,732,930 | A | 5/1973 | D'Anneo | |
| 3,738,429 | A | 6/1973 | Heller et al. | |
| 3,802,574 | A | 4/1974 | Weider | |
| 4,178,994 | A | 12/1979 | Ito et al. | |
| 4,418,757 | A | 12/1983 | Merkel | |
| 5,199,582 | A | 4/1993 | Halstrick | |
| 5,368,174 | A | 11/1994 | Clark et al. | |
| 5,386,917 | A | 2/1995 | Clark et al. | |
| 5,915,479 | A | 6/1999 | Ponte | |
| 7,165,624 | B1 | 1/2007 | Fischer | |
| 7,793,736 | B2 | 9/2010 | Golinveaux et al. | |
| 7,798,239 | B2 | 9/2010 | Golinveaux et al. | |
| 8,408,321 | B2 | 4/2013 | Golinveaux et al. | |
| RE44,404 | E | 8/2013 | Golinveaux et al. | |
| 8,773,461 | B2 | 5/2014 | Pigeon | |
| 8,905,151 | B2 | 12/2014 | Silva, Jr. et al. | |
| 9,050,481 | B2 | 6/2015 | Fenton et al. | |
| 9,498,787 | B2 | 11/2016 | Fenton et al. | |
| 2010/0132962 | A1 | 6/2010 | Silva, Jr. et al. | |
| 2011/0017476 | A1 | 1/2011 | Fuchs | |
| 2011/0036598 | A1 | 2/2011 | Pahila | |
| 2015/0325238 | A1 | 12/2015 | Fenton et al. | |

FOREIGN PATENT DOCUMENTS

| | | | |
|---|---|---|---|
| TW | 200920441 | A | 5/2009 |
| WO | 2008/145809 | A | 12/2008 |
| WO | 2011/116012 | A1 | 9/2011 |

OTHER PUBLICATIONS

Office Action Action dated Jun. 28, 2017, issued in corresponding Taiwan Patent Application No. 102128646.

Official Action and Search report dated May 22, 2018, issued in corresponding Taiwanese Patent Application No. 102128646.

"Standard for the Installation of Sprinkler Systems," NFPA 13 Chapter 8, National Fire Protection Association (Quincy Massachusetts), 2012, pp. 1 to 100.

* cited by examiner

Maximum Temperature (°F)

| | | | | | | | | | | |
|---|---|---|---|---|---|---|---|---|---|---|
| Sprinkler 91...100 | 109 | 109 | 109 | 93 | 104 | 100 | 106 | 106 | 109 | 109 |
| Sprinkler 81... 90 | 111 | 115 | 118 | 115 | 109 | 111 | 117 | 113 | 115 | 113 |
| Sprinkler 71... 80 | 115 | 120 | 129 | 135 | 124 | 126 | 124 | 126 | 122 | 113 |
| Sprinkler 61... 70 | 118 | 122 | 133 | 144 | 147 | 140 | 142 | 133 | 120 | 117 |
| Sprinkler 51... 60 | 113 | 120 | 124 | 156 | 203 | 180 | 149 | 131 | 122 | 120 |
| Sprinkler 41... 50 | 111 | 115 | 127 | 154 | 221 | 221 | 167 | 131 | 122 | 115 |
| Sprinkler 31... 40 | 122 | 133 | 147 | 172 | 185 | 171 | 162 | 140 | 133 | 120 |
| Sprinkler 21... 30 | 118 | 129 | 145 | 135 | 135 | 129 | 138 | 138 | 129 | 118 |
| Sprinkler 11... 20 | 120 | 122 | 118 | 122 | 111 | 111 | 118 | 120 | 122 | 120 |
| Sprinkler 1... 10 | 111 | 111 | 111 | 109 | 106 | 106 | 111 | 109 | 113 | 117 |

Activation Times (min:sec)

| | | | | | | | | | | |
|---|---|---|---|---|---|---|---|---|---|---|
| Sprinkler 91...100 | | | | | | | | | | |
| Sprinkler 81... 90 | | | | | | | | | | |
| Sprinkler 71... 80 | | | | | | | | | | |
| Sprinkler 61... 70 | | | | | | | | | | |
| Sprinkler 51... 60 | | | | | | | | | | |
| Sprinkler 41... 50 | | | | | | 01:02 | | | | |
| Sprinkler 31... 40 | | | | | | | | | | |
| Sprinkler 21... 30 | | | | | | | | | | |
| Sprinkler 11... 20 | | | | | | | | | | |
| Sprinkler 1... 10 | | | | | | | | | | |

*FIG. 13*

IN-RACK FIRE PROTECTION SPRINKLER SYSTEM INCLUDING AT LEAST ONE UNITARY HORIZONTAL BARRIER THAT COVERS RACKS OF ADJOINING RACKS AND AT LEAST ONE RACK LEVEL FIRE PROTECTION SPRINKLER DISPOSED BELOW THE AT LEAST ONE HORIZONTAL BARRIER

CROSS REFERENCE TO RELATED APPLICATIONS

This application is a continuation of U.S. patent application Ser. No. 18/151,565, filed Jan. 9, 2023, now U.S. Pat. No. 11,786,767, issued Oct. 17, 2023, which is a continuation of U.S. patent application Ser. No. 16/520,474, filed Jul. 24, 2019, now U.S. Pat. No. 11,571,593, issued Feb. 7, 2023, which is a continuation of U.S. patent application Ser. No. 15/446,772, filed Mar. 1, 2017, now U.S. Pat. No. 10,369,391, issued Aug. 6, 2019, which is a divisional of U.S. patent application Ser. No. 14/379,483, filed Aug. 18, 2014, now U.S. Pat. No. 10,272,274, issued Apr. 30, 2019, which is a U.S. National Stage Patent Application of International Patent Application No. PCT/US2013/054213, filed Aug. 8, 2013, which claims the benefit of U.S. Provisional Patent Application No. 61/709,714, filed Oct. 4, 2012, and U.S. Provisional Patent Application No. 61/681,999 filed Aug. 10, 2012, each of which is incorporated herein in its entirety.

BACKGROUND OF THE INVENTION

The following disclosure relates to a fire protection system for rack storage, and in particular to an in-rack fire protection sprinkler system capable of protecting exposed, expanded and unexpanded, plastics.

Rack storage is a conventional storage arrangement used in various industries and facilities. As provided in Section 3.9.3.7 of the U.S. National Fire Protection Association Standard 13 (NFPA 13) (2007 Ed.), a "rack" is "[a]ny combination of vertical, horizontal, and diagonal members that supports stored materials. Shelving in some racks can be solid, slatted, or open. Racks can also be fixed, portable, or movable. Loading commodities can be either manual—using lift trucks, stacker cranes, or hand placement—or automatic—using machine-controlled storage and retrieval systems." Conventionally, a commodity 102 to be protected is placed on a pallet 104 and the commodity 102 and the pallet 104 are stored together on a shelf 106 in a rack 108, as shown in FIG. 1A.

Racks can be single row, double row, or multiple row, with or without solid shelving. The terms "single row," "double row," and "multiple row" refer to the depth of the rack configuration in terms of the number of pallets that can be stored back to back. For example, a double row rack 108 has a depth that can accommodate two pallets back to back, as shown in the end elevation view of the schematic shown in FIG. 1B. When the palletized commodities 102 are stored apart from one another in the racks 108, 108 the spaces formed between the palletized commodities 102 form transverse flue spaces 112, as shown in FIGS. 1A and 1C. Also, the vertical spaces between adjoining racks 108 (i.e., the spaces between the backs of rows of storage) form what are known as longitudinal, or vertical, flue spaces 114 (FIGS. 1B and 1C). An isometric view of a conventional double row rack 108 showing the relationship of various parameters is shown in FIG. 2. As shown in FIGS. 3A and 3B, double and multiple-row racks 108 are conventionally spaced apart from other double or multiple-row racks 108 by an aisle width 118, which is conventionally 4 feet or 8 feet (1.22 meters to 2.44 meters). FIGS. 3A and 3B also show, respectively, a plan view and an end elevation view of two double row rack arrangements 108 separated by an aisle having an aisle width 118.

Fire protection sprinklers are conventionally connected to a conduit to receive pressurized fire-extinguishing fluid, such as water. A typical fire protection sprinkler has a base with a threaded portion for connection to the conduit, and an output orifice to output the fire-extinguishing fluid to provide fire control and/or fire suppression. The output orifice is sealed by a seal cap that is held in place by a release mechanism. The release mechanism is designed to release the seal cap under predetermined conditions, thereby initiating the flow of the fire-extinguishing fluid. A typical release mechanism includes a thermally-responsive element, e.g., a frangible bulb or fusible link, and may also include a latching mechanism.

Certain conventional fire protection sprinklers have a pair of arms that extend from the base portion and meet at a hub portion to form a frame. The hub portion is spaced apart from the output orifice of the base portion and is aligned with a longitudinal axis of the base portion. The hub portion may have a set-screw configured to apply a pre-tension force to the release mechanism. A deflector may be mounted on the hub, transverse to the output orifice, to provide dispersion of the output fire-extinguishing fluid.

Fire protection sprinklers may be mounted on a fluid conduit running along a ceiling and may either extend downward from the fluid conduit, referred to as a "pendent" configuration, or may extend upward from the fluid conduit, referred to as an "upright" configuration. Alternatively, fire protection sprinklers may be mounted on a wall, a certain distance below the ceiling, referred to as a "horizontal sidewall" configuration. An output orifice of a horizontal sidewall fire protection sprinkler is oriented so that the fire-extinguishing fluid is output horizontally and sprays onto an area to be protected in front of the fire protection sprinkler.

An "extended coverage storage sprinkler (specific application)," as described in Section 55.1 of the Standard for Automatic Sprinklers for Fire-Protection Service, published by Underwriters' Laboratories, 11th Ed., Nov. 4, 2005 (UL 199) is a fire protection sprinkler that is intended to be installed using the extended coverage area up to 196 square feet (e.g., 14 feet by 14 feet (4.27 meters by 4.27 meters, or 18.21 square meters)), and using specific application criteria specified in NFPA 13. These extended coverage storage fire protection sprinklers (specific application) incorporate a heat responsive element and release mechanism that has a response time equal to or less than that of a standard response fire protection sprinkler designed for standard spacings up to 100 square feet (e.g., 10 feet by 10 feet (3.05 meters by 3.05 meters, or 9.30 square meters)). Extended coverage fire protection sprinklers are installed in accordance with Section 8.8.2 of NFPA 13.

NFPA 13 defines a number of different types of storage sprinkler configurations and protection criteria. Conventionally, fire protection systems that provide fire protection for commodities stored in storage racks include fire protection sprinklers that are arranged within the storage racks, i.e., in-rack or rack level fire protection sprinklers, that may be disposed directly above the commodity stored on a shelf of the storage rack. Section 8.13 of NFPA 13 specifies installation requirements for in-rack fire protection sprinklers, and section 8.13.2.2 of NFPA 13 requires that in-rack fire protection sprinklers be ordinary-temperature, standard response, or quick response fire protection sprinklers and have a nominal K-factor of 5.6 or 8.0 gpm/(psi)$^{1/2}$.

Chapter 13 of NFPA 13 describes configurations of in-rack fire protection sprinklers for various classifications of commodities for storage heights up to 12 feet (3.66 meters). According to section 13.3.2 of NFPA 13, in-rack fire protection sprinklers shall have a K-factor of 5.6 gpm/(psi)$^{1/2}$ or greater, and shall operate at a minimum pressure of 15 psi (1 bar). Table 13.2.1 and FIG. 13.2.1 of NFPA 13, Chapter 13, specify the maximum ceiling height, maximum storage height, area of sprinkler operation, and discharge density for various hazard classes and storage types for in-rack fire protection sprinkler installations for storage up to 12 feet (3.66 meters) in height. Section 16.2 of NFPA 13 provides "Protection Criteria for Rack Storage of Class I Through Class IV Commodities Stored Up to and Including 25 ft in Height," Section 16.3 provides "Protection Criteria for Rack Storage of Class I Through Class IV Commodities Stored Over 25 ft in Height," and Chapter 17 provides "Protection of Plastic and Rubber Commodities That are Stored on Racks."

Fire protection of rack storage configurations poses a number of challenges. Fire protection sprinkler systems are usually required to be installed in warehouses and other similar article storage areas. Conventional fire protection sprinkler systems are generally installed in the ceiling of the building and the fire protection sprinklers spray water in the area of the fire to either control and/or to extinguish the fire. In storage areas including racks, however, a fire that starts on a lower rack is shielded from the spray emanating from a fire protection sprinkler positioned above the rack, either by shelving above the rack or by commodities stored above the rack. This factor is significantly aggravated as the number of shelves is increased. Moreover, in cases in which fire protection sprinklers are located in the ceiling above a given rack, a fire in lower shelves of the rack may not actuate the heating-actuated sensing elements of the fire protection sprinklers in a sufficiently short amount of time to provide effective control of the fire. And, as noted, even when the fire protection sprinklers of the fire protection system are actuated, the fire on the lower shelves is protected from the spray by upper shelves, and thus, the fire can spread upwardly.

In particular, early suppression-fast response (ESFR) fire protection sprinklers and control mode special application (CMSA) fire protection sprinklers have been used as ceiling level fire protection sprinklers in place of in-rack fire protection sprinklers. Conventional ESFR and CMSA fire protection sprinklers must operate at a relatively high pressure and discharge relatively large volumes of water in order to provide the same level of fire protection as the in-rack fire protection sprinklers they replace. The increased water demand and higher operating pressure required by ESFR and CMSA fire protection sprinklers, however, are generally undesirable consequences. Moreover, ESFR and CMSA fire protection sprinklers are not approved for the protection of all storage commodities and commodity storage configurations. Furthermore, ESFR and CMSA fire protection sprinklers are limited for use based on building heights.

Overhead or roof fire protection sprinkler systems that are supplemented by intermediate levels of fire protection sprinklers have been suggested, including, for example, fire protection sprinklers mounted within the storage racks, and also within aisles between the storage racks (e.g., U.S. Pat. No. 3,732,930 (D'Anneo)). This arrangement was not generally satisfactory because consistent, timely, and dependable detection and fire protection sprinkler actuation was not achievable. Consequently, greater damage to stored material, and greater risk to the stored commodity and the building structure, prevented widespread use of this arrangement in high storage facilities. Moreover, installing fire protection sprinklers within storage racks increases the cost and complexity of the fire protection sprinkler system, and reduces the flexibility of locating and relocating the storage racks due to the fixed position of the fluid conduit (i.e., the fire protection sprinkler plumbing). Also, because commodities may be routinely moved in and out of the storage racks, there is an increased risk of damage to the in-rack fire protection sprinklers from such handling of the commodities.

Also, fire protection systems using foam have been suggested for use in high-rise storage facilities. Generally, such a system has a foam generator coupled with a suitable sensing system that is capable of filling an entire building volume with a light foam. Single generators capable of producing as much as 2,000 cubic feet per minute (56.63 cubic meters per minute) of foam are available. The time required for filling the building varies, but generally ranges from two minutes to eight minutes. Such systems are not completely satisfactory because the foam may damage goods (i.e., the commodities) stored within the facility. Also, when the fire occurs at a high elevation, the foam may not reach the height at which the fire is located for some time, permitting the fire to spread to the roof or the ceiling and become out-of-control. Further, the foam system mentioned in the D'Anneo patent is relatively expensive, requires great quantities of water, and requires a good deal of maintenance, and the generators that are heavy and are normally mounted on the roof may result in structural damage if insufficient reinforcement is provided. In addition, removal of the foam from the warehouse after the fire is extinguished is a problem.

SUMMARY OF THE INVENTION

According to one aspect, our invention provides a fire protection sprinkler system for the protection of commodities including Class I-IV hazards, Group A cartoned and exposed plastics (expanded and unexpanded), flammable liquids, tires, roll paper, and aerosols, stored in a plurality of adjoining racks that have a vertical flue space provided between a set of racks of the plurality of adjoining racks, the system comprising a fluid supply conduit configured to deliver a fire protection fluid received from a fire protection fluid source, at least one horizontal barrier that covers a rack, of the plurality of adjoining racks, another rack, of the plurality of adjoining racks, that is adjacent to the rack, and the vertical flue space between the rack and the other rack, the at least one horizontal barrier being provided at a predetermined height, and having a width that is at least equal to a width of the rack, and having a depth that is at least equal to a sum of a depth of the rack, a depth of the other rack, and a depth of the vertical flue space, wherein the at least one horizontal barrier is a sheet having one or more apertures, and at least one rack level fire protection sprinkler connected to the fluid supply conduit, the at least one rack level sprinkler being disposed in the vertical flue space below the at least one horizontal barrier, having a K-factor of 11.2 gpm/(psi)$^{1/2}$ or greater, and being vertically spaced from the commodities stored on the rack and the other rack covered by the at least one horizontal barrier.

According to another aspect, our invention provides a rack and fire protection sprinkler system comprising a first plurality of adjoining racks having a vertical flue space provided between a pair of adjacent racks of the first plurality of adjoining racks, and a fire protection sprinkler system for the protection of commodities including Class I-IV hazards, Group A cartooned and exposed plastics (expanded and unexpanded), flammable liquids, tires, roll paper, and aerosols, stored in the first plurality of adjoining racks, the sprinkler system comprising a first fluid supply conduit configured to deliver a fire protection fluid received from a fire protection fluid source, at least one first horizontal barrier that covers (i) a rack, of the first plurality of adjoining racks, (ii) another rack, of the first plurality of adjoining racks, that is adjacent to the rack, and (iii) the vertical flue space between the rack and the other rack, of the first plurality of adjoining racks, the at least one first horizontal barrier being provided at a first predetermined height, having a width that is at least equal to a width of the rack, of the first plurality of racks, and having a depth that is at least equal to a sum of (i) a depth of the rack, of the first plurality of racks, (ii) a depth of the other rack, of the first plurality of racks, and (iii) a depth of the vertical flue space, wherein the at least one first horizontal barrier is a sheet having one or more apertures, at least one first rack level fire protection sprinkler connected to the first fluid supply conduit, the at least one first rack level sprinkler (i) being disposed in the vertical flue space below the at least one first horizontal barrier, (ii) having a K-factor of 11.2 gpm/(psi)$^{1/2}$ or greater, and (iii) being vertically spaced from the commodities stored on the rack and the other rack, of the first plurality of adjoining racks, covered by the at least one first horizontal barrier, and at least one ceiling level fire protection sprinkler provided above the at least one first horizontal barrier.

BRIEF DESCRIPTION OF THE DRAWINGS

FIG. 13 includes tables listing maximum temperatures and activation times from testing of the fire protection sprinklers shown in FIG. 12.

Reference numerals that are the same, but that appear in different figures, represent the same elements, even if those elements are not described with respect to each figure.

DESCRIPTION OF THE EMBODIMENTS

As used in this detailed description, the term "rack level" denotes a position within the vertical flue space between rows of adjoining racks between a floor and a top of the racks, but not disposed in a rack. Moreover, as used in this detailed description, the term "ceiling level" denotes a position between the top of the racks and a ceiling of a building.

A fire protection sprinkler system for single row, double row, and multiple row rack storage and racks for automatic rack systems is provided that includes at least one rack level fire protection sprinkler 144 that is fluidly coupled to a fluid supply conduit 116. In one embodiment, the rack level fire protection sprinkler 144 is constructed as an extended coverage storage fire protection sprinkler. For example, the extended coverage storage fire protection sprinkler used as the rack level fire protection sprinkler 144 is a model N252 EC fire protection sprinkler, manufactured by The Reliable Automatic Sprinkler Company, Inc., of Liberty, South Carolina, United States. The N252 EC fire protection sprinkler has a relatively wide water distribution pattern of up to 196 square feet (18.21 square meters), and produces a large droplet size. The N252 EC fire protection sprinkler is capable of pre-wetting areas surrounding a fire that have not yet combusted, so as to contain the spread of the fire to adjacent areas. In at least one embodiment in which extended coverage storage fire protection sprinklers 144 are employed as the rack level fire protection sprinklers 144, it is possible to eliminate using fire protection sprinklers in the transverse flue space and to reduce the overall number of rack level fire protection sprinklers 144.

Figure 4A:
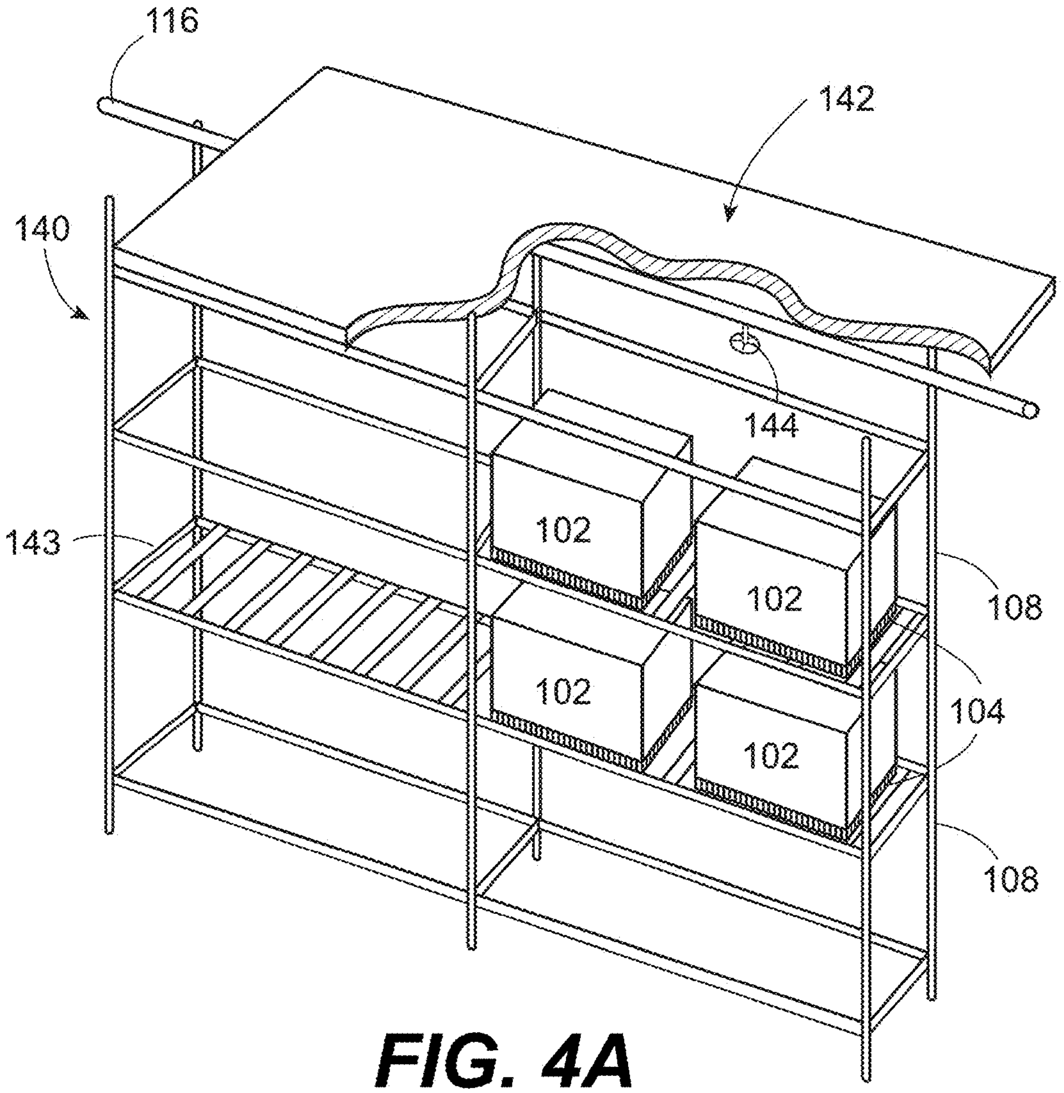
FIG. 4A shows an isometric cutaway view of an embodiment of a fire protection system in accordance with the invention that includes at least one unitary horizontal barrier 142.
Figure 4B:
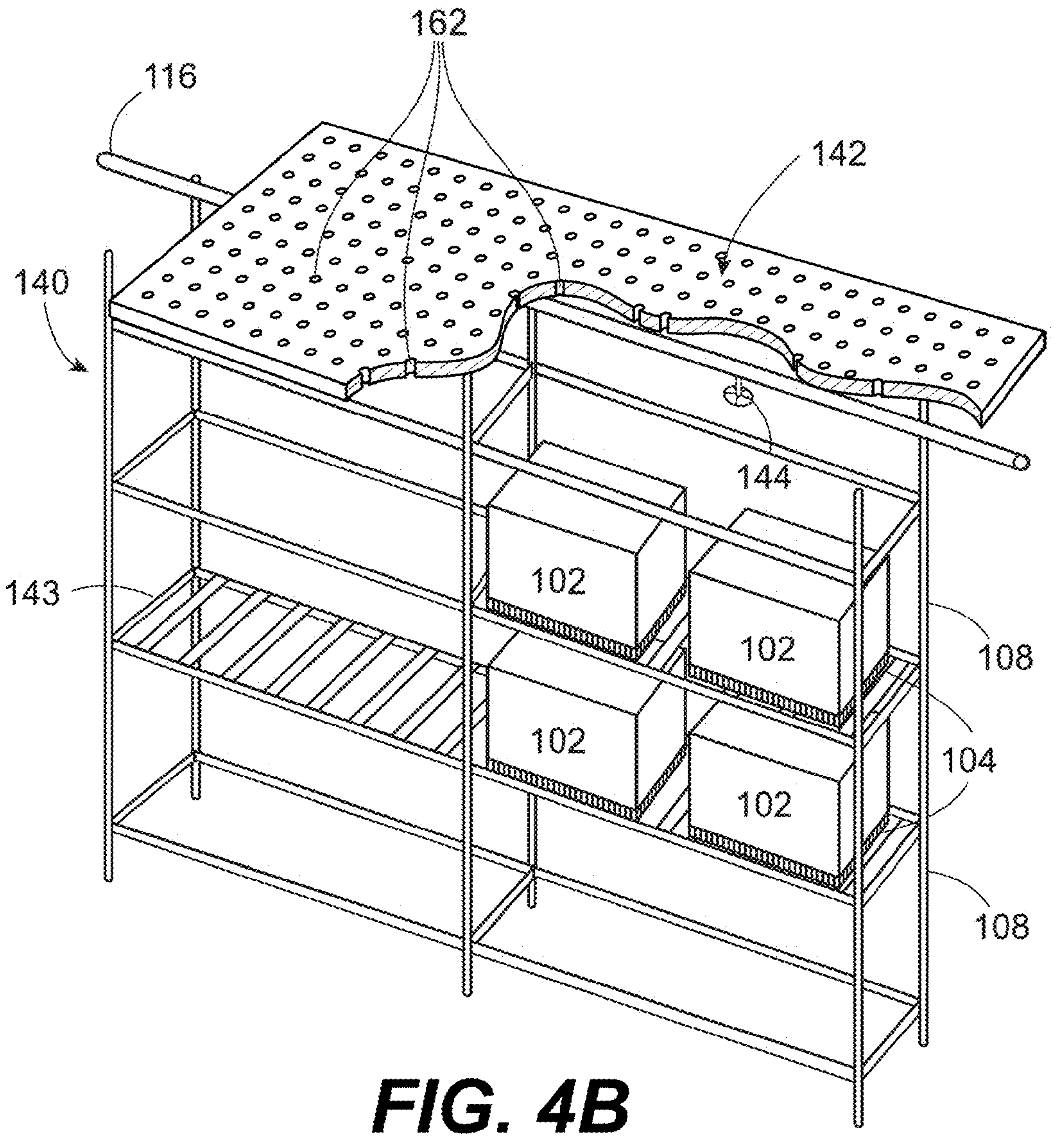
FIG. 4B shows an isometric cutaway view of an embodiment of a fire protection system in accordance with the invention that includes at least one unitary horizontal barrier 142 having perforations 162.

As shown in FIGS. 4A and 4B, two racks 108 are arranged, one on top of the other, in two levels, to form a storage array 140. A solid horizontal barrier 142 is provided above the uppermost rack 108. The solid horizontal barrier 142 can be constructed of a solid material, such as wood, metal, or a non-combustible material, as defined in NFPA 13. A horizontal barrier 143 that may be a slatted grate, an open grate, or a wire grate, is provided between the racks 108. The rack level fire protection sprinklers 144 are positioned below the solid horizontal barrier 142. The solid horizontal barrier 142 may be positioned at a maximum predetermined height based on the commodities 102 stored in the racks 108 and the construction of the rack level fire protection sprinklers 144. In the embodiment shown in FIG. 4B, the at least one unitary horizontal barrier 142 includes a plurality of perforations 162. In the embodiment shown in FIG. 5, each rack 108 has a height of about 10 feet (3.05 meters), and the racks 108 are stacked one on top of the other in two levels, forming a multiple row rack having a total height of 20 feet (6.096 meters). Although two racks 108 are shown stacked in the arrangement shown in FIG. 5, the arrangement may include any number of racks 108 in combination stacked below the solid horizontal barrier 142 up to the predetermined height of, in this embodiment, 20 feet (6.096 meters).

Palletized commodities 102 are stacked in each level of the racks 108. The commodities 102 stored in the racks 108 may include one or more of Class I-IV hazards, Group A cartooned and exposed plastics (expanded and unexpanded), flammable liquids, tires, roll paper, and aerosols, as defined in NFPA 13. In the embodiment shown in FIG. 5, in each 10-foot (3.05-meter) high level of the racks 108, two palletized commodities 102 are stacked on top of one another at a height that is between 8 feet and 9 feet (2.44 meters and 2.74 meters) from a floor 145. Thus, in the embodiment shown in FIG. 5, the solid horizontal barrier 142 is spaced from the commodity 102 directly below the solid horizontal barrier 142 by 1 feet to 2 feet (0.30 meter to 0.61 meter), and the dimension from the floor 145 to the top of the upper commodity 102 in the upper level of the racks 108 is between 18 feet and 19 feet (5.49 and 5.79 meters). The length of each rack 108 is about 8 feet (2.44 meters). The rack level fire protection sprinklers 144 are disposed in the vertical flue space 114 at a height of about 20 feet (6.096 meters) from the floor 145, and are centered with the length of the racks 108 (i.e., at about 4 feet (1.22 meters) from the ends of the racks 108). The fire protection sprinklers 144 are horizontally spaced about every 8 feet (2.44 meters) in the vertical flue space 114, as shown in FIG. 4. In other arrangements, however, the rack level fire protection sprinklers 144 may be spaced on the fluid supply conduit 116 at a spacing of between about 8 feet and 18 feet (2.44 meters and 5.49 meters).

Figure 5:
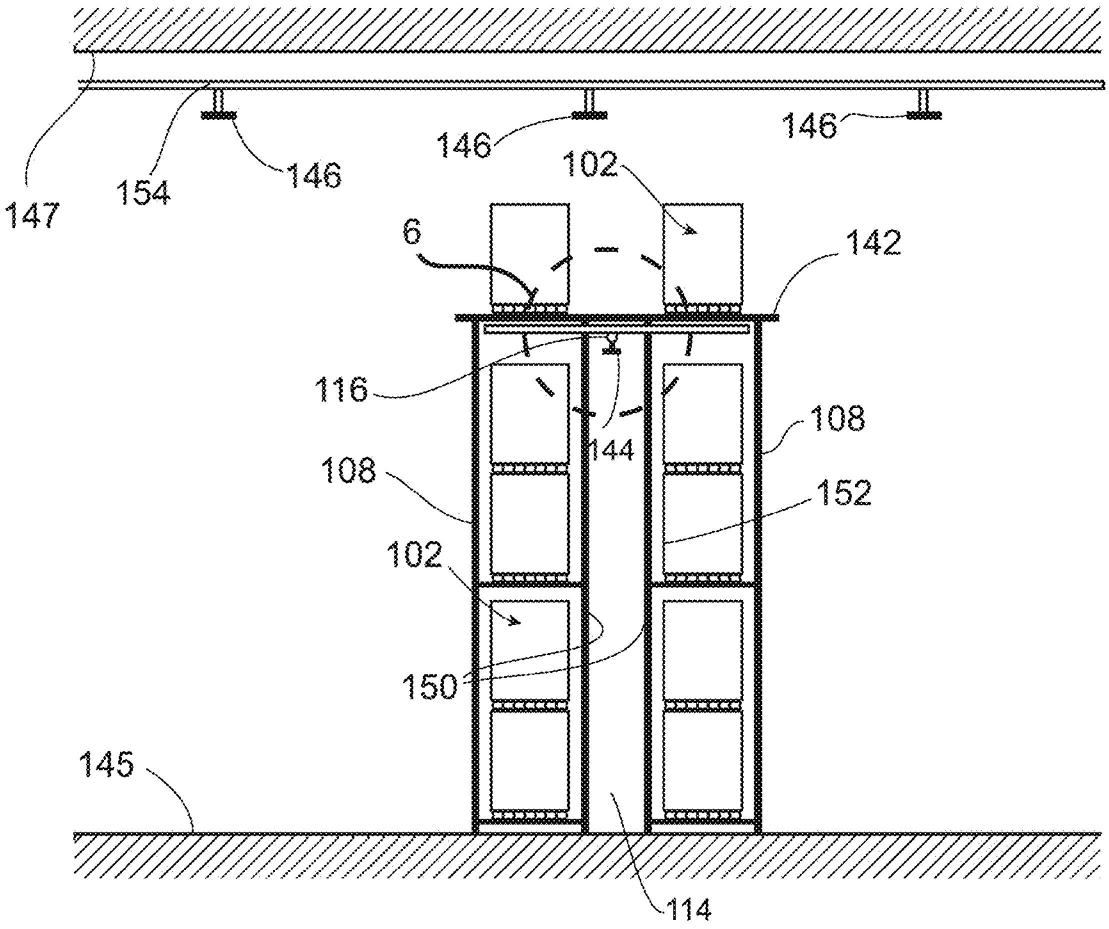
FIG. 5 shows an end elevation view of the fire protection system shown in FIG. 4.
Figure 7:
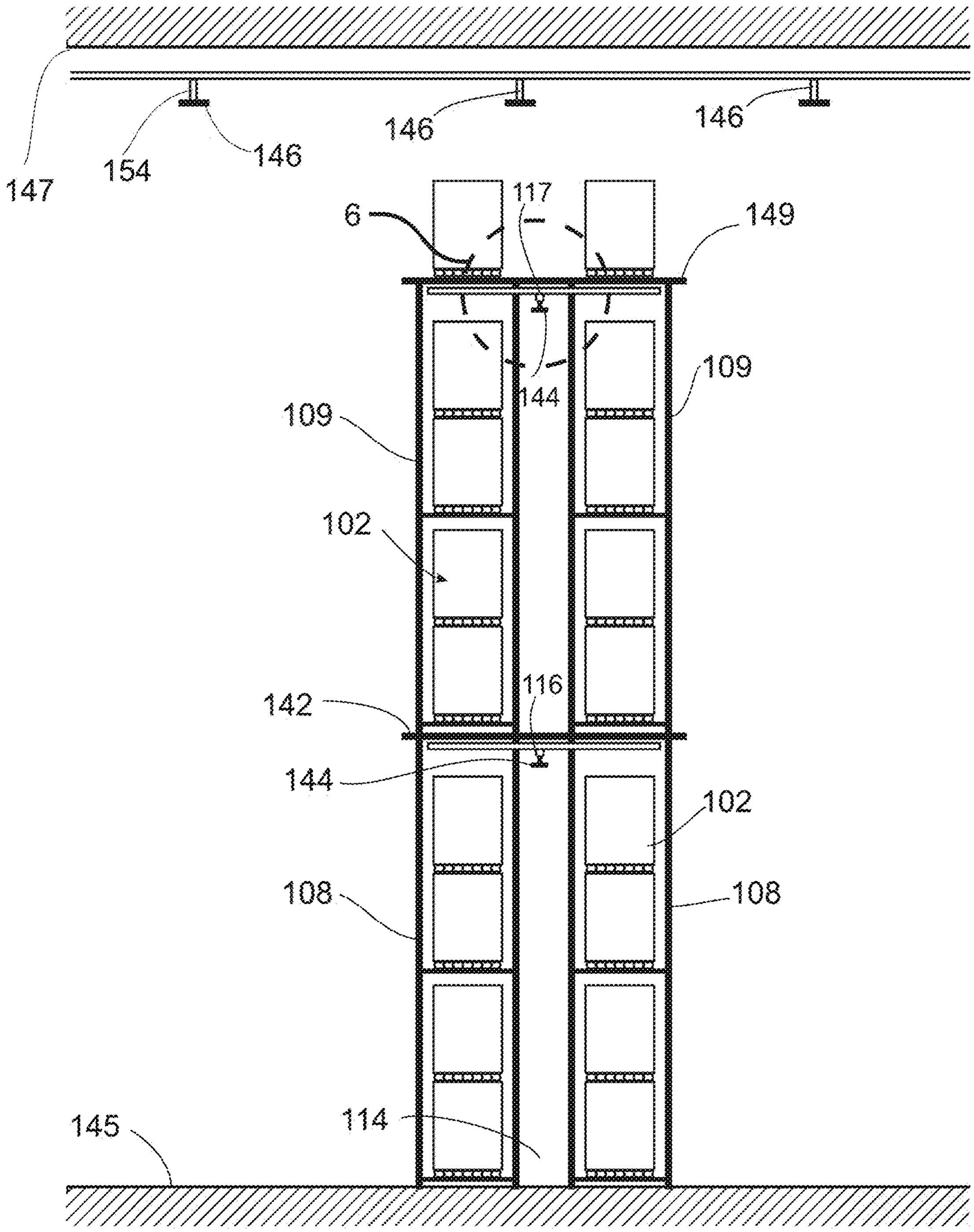
FIG. 7 is an end elevation view of the fire protection system shown in FIG. 5 with the addition of a second level of rack storage.

The solid horizontal barrier 142 may extend horizontally across the racks 108, and may extend fully or partially into the vertical flue space 114 above the rack level fire protection sprinklers 144 in between rear faces 150 of both racks 108, as shown in FIGS. 5 and 7. The solid horizontal barrier 142 can collect heat that rises as a result of combustion occurring between the floor 145 and the solid horizontal barrier 142, and can also direct such heat toward the thermally responsive element that activates the rack level fire protection sprinkler 144. Since the commodities 102 themselves, when stored in the racks 108, cover a substantial horizontal area of the rack 108, however, the undersides of the commodities 102 may partially substitute for the solid horizontal barriers 142 by collecting heat from below the commodities 102. That is, in one embodiment, the solid horizontal barriers 142 shown in FIGS. 5 and 7 may be substituted with one or more partial horizontal barriers to cover horizontal areas in the racks 108 that are not suitably covered by the stored commodities 102. For example, a relatively shorter horizontal barrier (not shown) may extend from a rear face 152 of the commodity 102 and extend toward the vertical flue space 114. Such a relatively shorter horizontal barrier may extend into the vertical flue space 114 and may extend over the rack level fire protection sprinklers 144.

As a substitute for the solid horizontal barriers 142, either in the racks 108 and/or in the vertical flue spaces 114, horizontal barriers having one or more openings may be employed. For example, the horizontal barriers may be constructed as sheets with one or more apertures.

Also, in at least one embodiment, a separate horizontal barrier (not shown) may be positioned over each rack level fire protection sprinkler 144 in the vertical flue space 114 to collect heat around a thermally responsive element that activates each rack level fire protection sprinkler 144. The separate horizontal barrier can be constructed of a solid material, such as one or more pieces of metal, wood, or non-combustible materials, as defined in NFPA 13. The separate horizontal barrier may be a continuous piece that extends to cover a plurality of rack level fire protection sprinklers 144 that are connected along the length of the fluid supply conduit 116. The separate horizontal barrier may be constructed with or without openings between the horizontally adjacent rack level fire protection sprinklers 144. Alternatively, each rack level fire protection sprinkler 144 may be covered separately by a corresponding horizontal barrier (not shown) that covers a single rack level fire protection sprinkler 144. Such a single-sprinkler horizontal barrier may be smaller to cover the individual rack level fire protection sprinklers 144 so that there are horizontal spaces between adjacent single-sprinkler horizontal barriers. For structural support and positioning, the horizontal barriers may be attached to the rack level fire protection sprinklers 144, to the fluid supply conduit 116, or to the racks 108.

Vertical barriers may also be used to control the spread of heat and fire horizontally within and between the racks 108, and to facilitate the transmission of heat vertically toward the rack level fire protection sprinklers 144. Such vertical barriers can compartmentalize the storage areas occupied by the commodities 102 into fire zones that are protected by the rack level fire protection sprinklers 144 associated with that fire zone. The vertical barriers may be formed of solid materials, such as metal and wood, or non-combustible materials as defined in NFPA 13. The vertical barriers may be used with or without the solid horizontal barriers 142.

In one embodiment, horizontal and vertical barriers are not employed. When such barriers are not employed, the rack level fire protection sprinklers 144 used are selected to have a sufficient thermal sensitivity and release timing so that the rack level fire protection sprinklers 144 are activated.

Figure 1A:
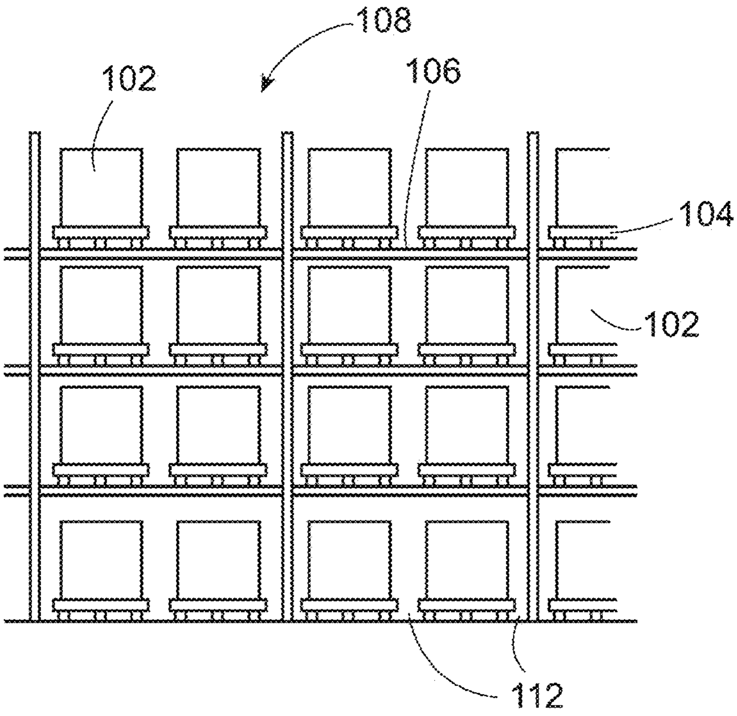
FIG. 1A shows a side elevation view of a double row storage rack arrangement.
Figure 1B:
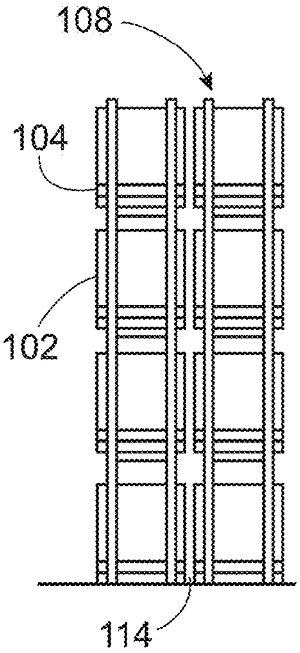
FIG. 1B shows an end elevation view of the double row storage rack arrangement shown in FIG. 1A.
Figure 1C:
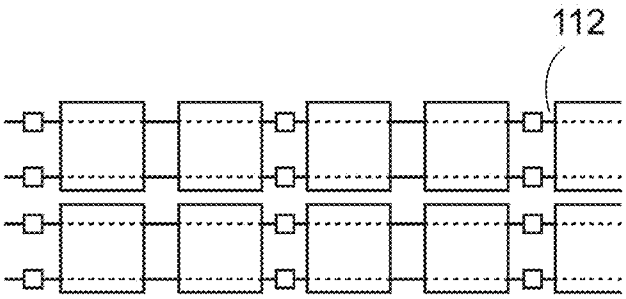
FIG. 1C shows a plan view of the double row storage rack arrangement shown in FIG. 1A.
Figure 2:
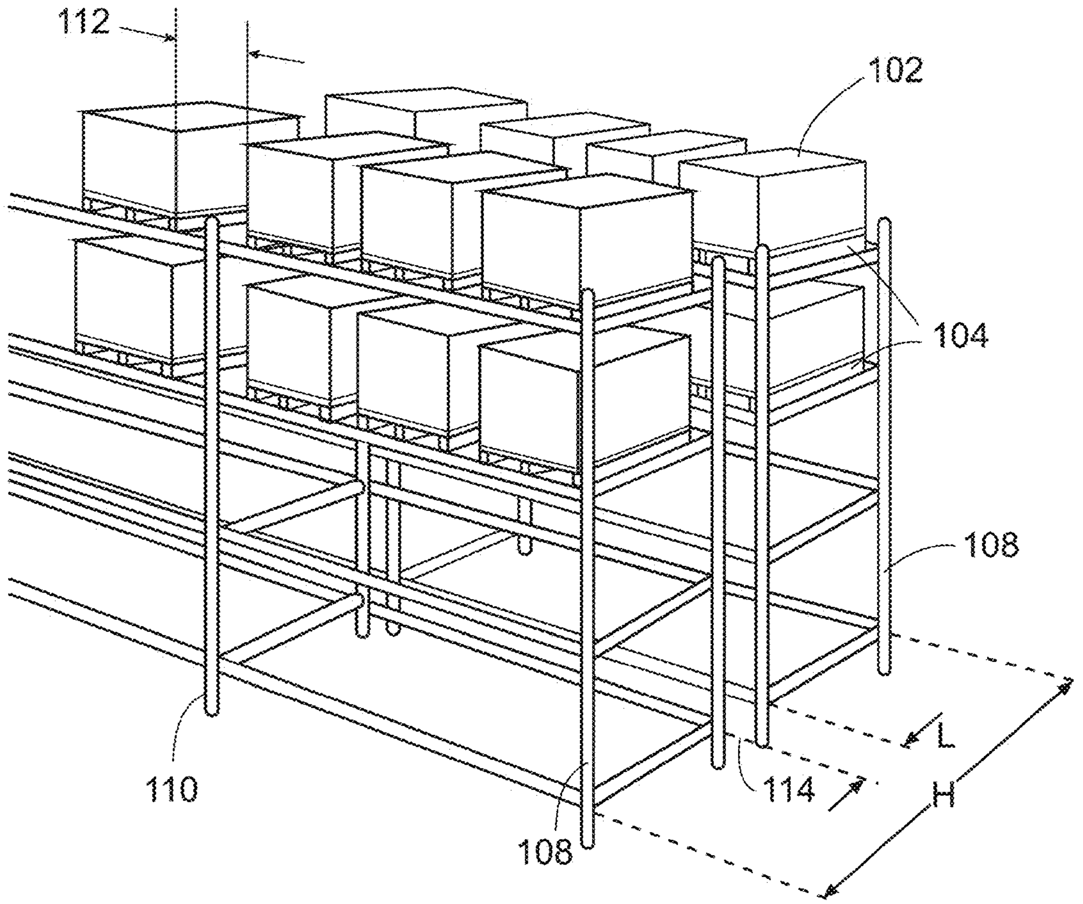
FIG. 2 shows a perspective view of another double row rack arrangement.
Figure 3A:
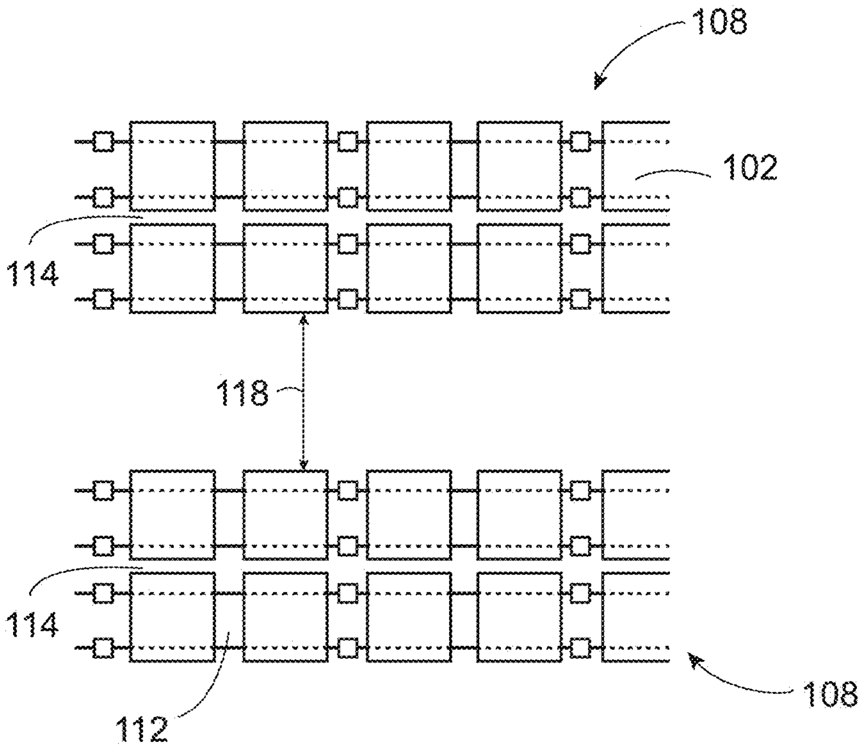
FIG. 3A shows a plan view of two double row rack arrangements separated by an aisle width.
Figure 3B:
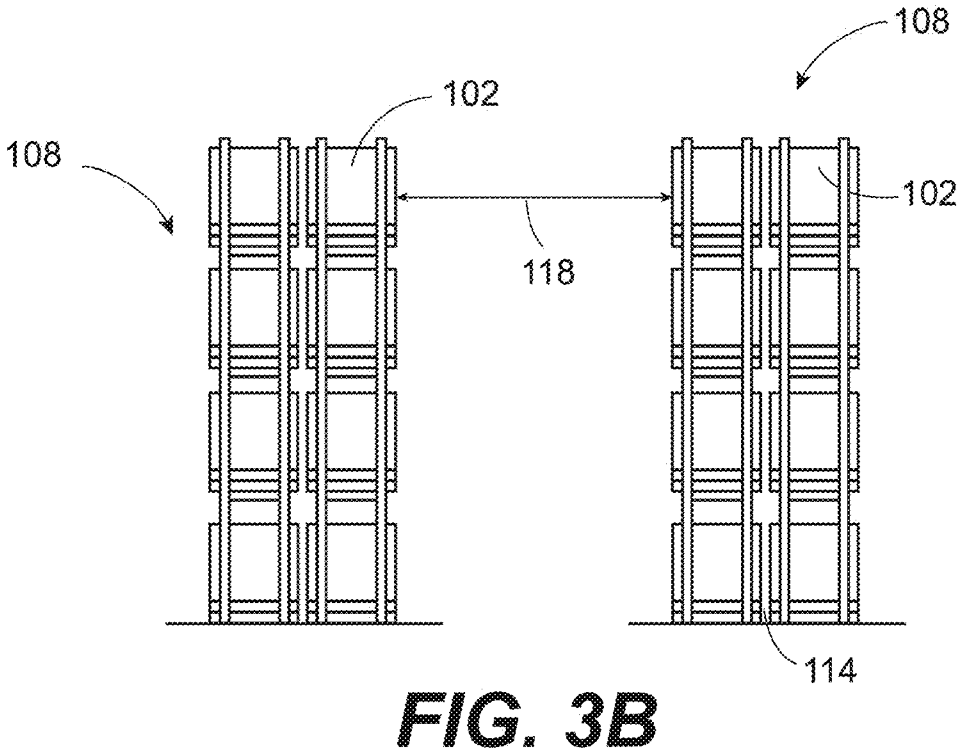
FIG. 3B shows an end elevation view of the double row rack arrangements shown in FIG. 3A.
Figure 6:
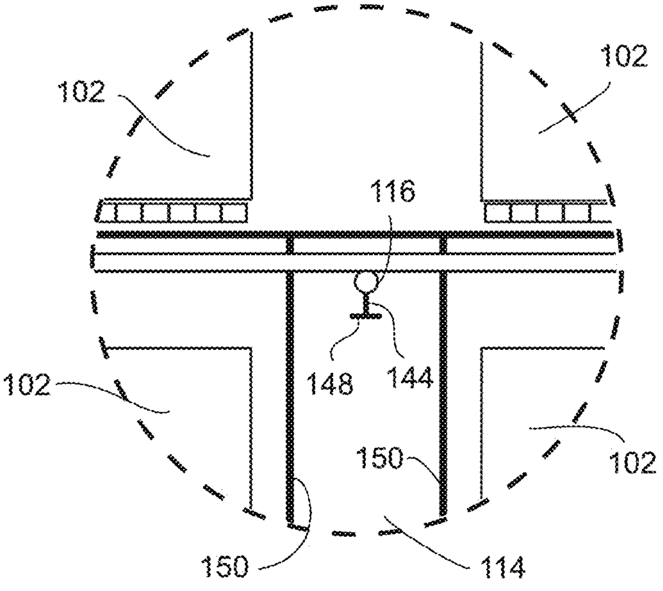
FIG. 6 is a detail view of the fire protection system shown in FIG. 5.

As shown in FIG. 5, two sets of multiple-row racks 108 are arranged back-to-back with the rear faces 150 defining the vertical flue space 114 between the racks 108. In the example shown in FIG. 5, a combined depth H (FIG. 2) of the racks 108 is between 7 feet and 8 feet (2.13 meters and 2.44 meters), a depth between a front and rear face of each rack is between 3 feet and 4 feet (0.91 meter and 1.22 meters), and a distance L between the rear faces 150 of the racks 108 (FIG. 2) is about 6 inches to 12 inches (15.24 centimeters to 30.48 centimeters). In general, the rack level fire protection sprinklers 144 are disposed centrally in the vertical flue space 114. As shown in greater detail in FIG. 6, the rack level fire protection sprinklers 144 are approximately centered between the two sets of racks 108. For example, when the racks 108 are spaced apart by 9 inches (22.86 centimeters), the rack level fire protection sprinkler 144 is located 4.5 inches (11.43 centimeters) from the rear face 150 of each rack 108. Also, as shown in FIG. 6, a deflector 148 of the rack level fire protection sprinkler 144 is spaced from the top of the commodity 102 by about 7.5 inches (19.05 centimeters). In other embodiments, however, the deflector 148 may be spaced about 1 inch to 12 inches (2.54 centimeters to 30.48 centimeters) or more above the commodity 102.

In FIGS. 4 and 5, the solid horizontal barrier 142 is located above the uppermost level of the rack 108, so that commodities 102 stored in the rack 108 up to a predetermined height are disposed between the solid horizontal barrier 142 and the floor 145. A plurality of ceiling level fire protection sprinklers 146 is located at a ceiling 147 above the solid horizontal barrier 142 and above all of the racks 108. The ceiling level fire protection sprinklers 146 provide fire protection for the commodities 102 stored above the uppermost solid horizontal barrier 142, as those commodities 102 are not protected by the rack level fire protection sprinklers 144. As discussed herein, each solid horizontal barrier 142 collects the heat between the solid horizontal barrier 142 and a lower solid horizontal barrier 142 (or the floor 145, for the lowermost solid horizontal barrier 142) below the solid horizontal barrier 142, in order to prevent or to reduce the number of the ceiling level fire protection sprinklers 146 from operating in the event of a fire below the solid horizontal barrier 142. In one embodiment, the predetermined spacing between two solid horizontal barriers 142 is up to 20 feet (6.10 meters). The floor 145 may be considered a solid horizontal barrier. Such spacing between the solid horizontal barriers 142 may depend on the commodity 102 stored, the rack level fire protection sprinklers 144 used, and the hazard classification, so that, in other embodiments, the spacing between solid horizontal barriers 142 may be between about 10 feet and 30 feet (3.05 meters and 9.14 meters). In embodiments in which the solid horizontal barriers 142 are not used, the spacing between vertically adjacent rack level fire protection sprinklers 144 may also depend on the same factors as those in which solid horizontal barriers 142 are used, i.e., the spacing may depend on the commodity 102 stored, the rack level fire protection sprinklers 144 used, and the hazard classification. Other factors may include the aisle width 118 between racks 108 and the water pressure. For example, if the hazard to be protected is less severe, a spacing greater than 20 feet (6.10 meters) between solid horizontal barriers 142 may be used, whereas in another example, if the hazard is more severe, a spacing less than 20 feet (6.10 meters) between solid horizontal barriers 142 may be used.

The arrangement of rack level fire protection sprinklers 144 used concurrently with ceiling level fire protection sprinklers 146, in accordance with the invention described herein, may be used to protect Class I-IV hazards, Group A cartooned and exposed plastics (expanded and unexpanded), flammable liquids, tires, roll paper, and aerosols stored in racks in occupancies having a ceiling 147 of any height, including occupancies having a ceiling 147 that has a height greater than 45 feet (13.72 meters).

The ceiling level fire protection sprinklers 146 may be any storage fire protection sprinkler having a K-factor of about 11.2 gpm/(psi)$^{1/2}$ or greater. Each of the ceiling level fire protection sprinklers 146 may also be an extended coverage control mode special application (EC CMSA), a special application, an extended coverage (EC), a storage, an extended coverage storage, or an early suppression fast response (ESFR) fire protection sprinkler. Also, in at least one embodiment, the ceiling level fire protection sprinklers 146 can be the same type of fire protection sprinkler as the rack level fire protection sprinklers 144. For example, in one embodiment, the ceiling level fire protection sprinklers 146 and the rack level fire protection sprinklers 144 are all model N252 EC fire protection sprinklers, manufactured by The Reliable Automatic Sprinkler Co. Inc. The ceiling level fire protection sprinklers 146 are spaced from each other on a ceiling level branch line conduit, or a ceiling fluid supply conduit, 154 at a spacing of about 8 feet to 20 feet (2.44 meters to 6.10 meters). The clearance between the ceiling level fire protection sprinklers 146 and the racks 108, and the clearance between the ceiling level fire protection sprinklers 146 and the commodities 102 stored in the racks 108 below the ceiling level fire protection sprinklers 146, are determined based on the relevant agency approval listing for those ceiling level fire protection sprinklers 146. Since the rack level fire protection sprinklers 144 below the solid horizontal barriers 142 (or the rack level fire protection sprinklers 144 in cases in which the solid horizontal barriers 142 are not used) are expected to operate in the event of a fire condition occurring below the solid horizontal barriers 142 (or below the rack level fire protection sprinklers 144), the total hydraulic demands of the fire protection sprinkler system may be reduced.

The rack level fire protection sprinklers 144 have a K-factor that is between about 11.2 gpm/(psi)$^{1/2}$ and 30 gpm/(psi)$^{1/2}$. In one embodiment, all of the rack level fire protection sprinklers 144 have the same K-factor. In another embodiment, however, not all of the rack level fire protection sprinklers 144 have the same K-factor. For example, in one embodiment, the K-factor of the rack level fire protection sprinklers 144 may depend on the vertical position of the rack level fire protection sprinkler 144 in the racks 108, such that rack level fire protection sprinklers 144 located at higher positions in the racks 108 have a greater K-factor than the rack level fire protection sprinklers 144 located at lower positions in the racks 108, or vice versa. Alternatively, the rack level fire protection sprinklers 144 having a higher K-factor may be positioned in the rack 108 closer to fire zones in which more severe hazards are stored. In the case of a rack level fire protection sprinkler 144 constructed as an N252 EC fire protection sprinkler, the rack level fire protection sprinklers 144 operate at a minimum pressure of about 7 psig (48.26 kPa) and discharge water at a rate of at least about 67 gpm (253.62 liters per minute). For rack level fire protection sprinklers 144 having a lesser or greater K-factor, the rack level fire protection sprinklers 144 will operate at a pressure of at least 7 psig (48.26 kPa). The minimum pressure is based on the commodity 102 being protected and the vertical spacing between the solid horizontal barriers 142, or, in a case in which the solid horizontal barriers 142 are not used, the minimum pressure may be based on the vertical spacing between vertically adjacent rack level fire protection sprinklers 144.

As shown in FIGS. 5 and 7, portions of the fluid supply conduit 116 extend through the vertical flue space 114 between each level of the solid horizontal barriers 142. Each portion of the fluid supply conduit 116 extends between about 5 feet and 40 feet (between about 1.52 meters and 12.19 meters). The portions of the fluid supply conduit 116 connected to the rack level fire protection sprinklers 144 are separate from the ceiling fluid supply conduit 154 connected to the ceiling level fire protection sprinklers 146, so as to create multiple, separate fire protection areas. The hydraulic demand of the rack level fire protection sprinklers 144 may or may not be added to the hydraulic demand of the fire protection sprinklers 146.

The rack level fire protection sprinklers 144 may be any one of a pendent, an upright, a horizontal sidewall, a vertical sidewall, and a conventional type of fire protection sprinkler, and may be oriented in either a pendent position or an upright position. In addition, the rack level fire protection sprinklers 144 can be constructed having ordinary, intermediate, or high thermal sensitivity (i.e., response time index, or RTI). The rack level fire protection sprinklers 144 may be arranged with a water shield, constructed like the water shields used with a model F1 and a model F1FR intermediate level fire protection sprinklers manufactured by The Reliable Automatic Sprinkler Company, Inc. Also, the rack level fire protection sprinklers 144 may be arranged with a guard, such as sprinkler guards for Model C fire protection sprinklers manufactured by The Reliable Automatic Sprinkler Company, Inc. The rack level fire protection sprinklers 144 may also be constructed with a thermal release element (i.e., a thermally responsive element) that is a bulb or a solder element. In at least one alternate arrangement, the rack level fire protection sprinklers 144 are not arranged in an upright orientation and/or are not constructed as upright fire protection sprinklers.

FIG. 7 shows a fire protection sprinkler system in which an upper set of racks 109 is installed above the solid horizontal barrier 142 shown in FIG. 5, below which a first level of rack level fire protection sprinklers 144 is connected to the fluid supply conduit 116. The upper set of racks 109 and palletized commodities 102 are arranged in the same manner as that of the lower racks 108 and palletized commodities 102. Likewise, a second fluid supply conduit 117 extends in the vertical flue space 114 below a second solid horizontal barrier 149 at the top of the upper set of racks 109. A second level of rack level fire protection sprinklers 144 is fluidly coupled to the second fluid supply conduit 117. The second level of rack level fire protection sprinklers 144 are aligned vertically and horizontally with the first level of rack level fire protection sprinklers 144 described above with respect to FIG. 5. In the embodiment shown in FIG. 7, the vertical spacing between the two levels of rack level fire protection sprinklers 144 and the solid horizontal barriers 142 and 149 is up to about 20 feet (6.10 meters). In other embodiments, however, the vertical spacing between the two levels of rack level fire protection sprinklers 144 and the solid horizontal barriers 142 and 149 may be between about 10 feet and 30 feet (between about 3.05 meters and 9.14 meters). Though not shown in FIG. 7, additional racks may be stacked in the same way as the upper set of racks 109 and are protected by providing additional rack level fire protection sprinklers 144 and solid horizontal barriers 142 spaced vertically up to the predetermined height, such as every 10 feet to 30 feet (3.05 meters to 9.14 meters).

The volume between the solid horizontal barriers (i.e., between the floor 145, the solid horizontal barrier 142, and the sold horizontal barrier 149), or between vertically adjacent rack level fire protection sprinklers 144 in arrangements without the solid horizontal barriers 142, 149, can be considered compartments. Such compartments may be further subdivided into a plurality of fire areas associated with each rack level fire protection sprinkler 144. The hydraulic demand for the racks 108 and 109 is determined by the most demanding fire area or the most demanding ceiling level fire protection sprinkler 146. Thus, as a result of the arrangement of fire areas within the racks 108 and 109 and separate ceiling level fire protection sprinkler 146 arrangement, the hydraulic demand of the rack level fire protection sprinklers 144 may or may not be added to the hydraulic demand of the ceiling level fire protection sprinklers 146.

The arrangement of the rack level fire protection sprinklers 144 and the ceiling level fire protection sprinklers 146, as described herein, provides a number of advantages over approaches to protection for rack storage described in the prior art. For example, the plurality of fire areas protected by rack level fire protection sprinklers 144 eliminates the conventional requirements for ceiling level fire protection sprinklers 146 to penetrate a deeply-rooted, floor-level fire. Instead, as described in accordance with an aspect of the invention, the rack level fire protection sprinklers 144 and the ceiling level fire protection sprinklers 146 are positioned relatively closer to the origin of a fire to contain the spread of fire. Moreover, fire protection sprinklers are not required to be placed in transverse flue spaces 112 or at the rear faces 150 of the racks 108 and 109, thereby improving access to the storage locations and reducing the chance of damaging the rack level fire protection sprinklers 144 during movement of the commodities 102 in and out of the racks 108 and 109. Instead, as described in accordance with an aspect of the invention, the rack level fire protection sprinklers 144 that have a relatively large K-factor and that are capable of producing large droplet sizes can be positioned in the vertical flue space 114 closer to the potential fire locations, thereby reducing the number of fire protection sprinkler heads opened during a fire reducing the amount of water typically required as compared with a ceiling level fire protection sprinkler system.

Figure 8:
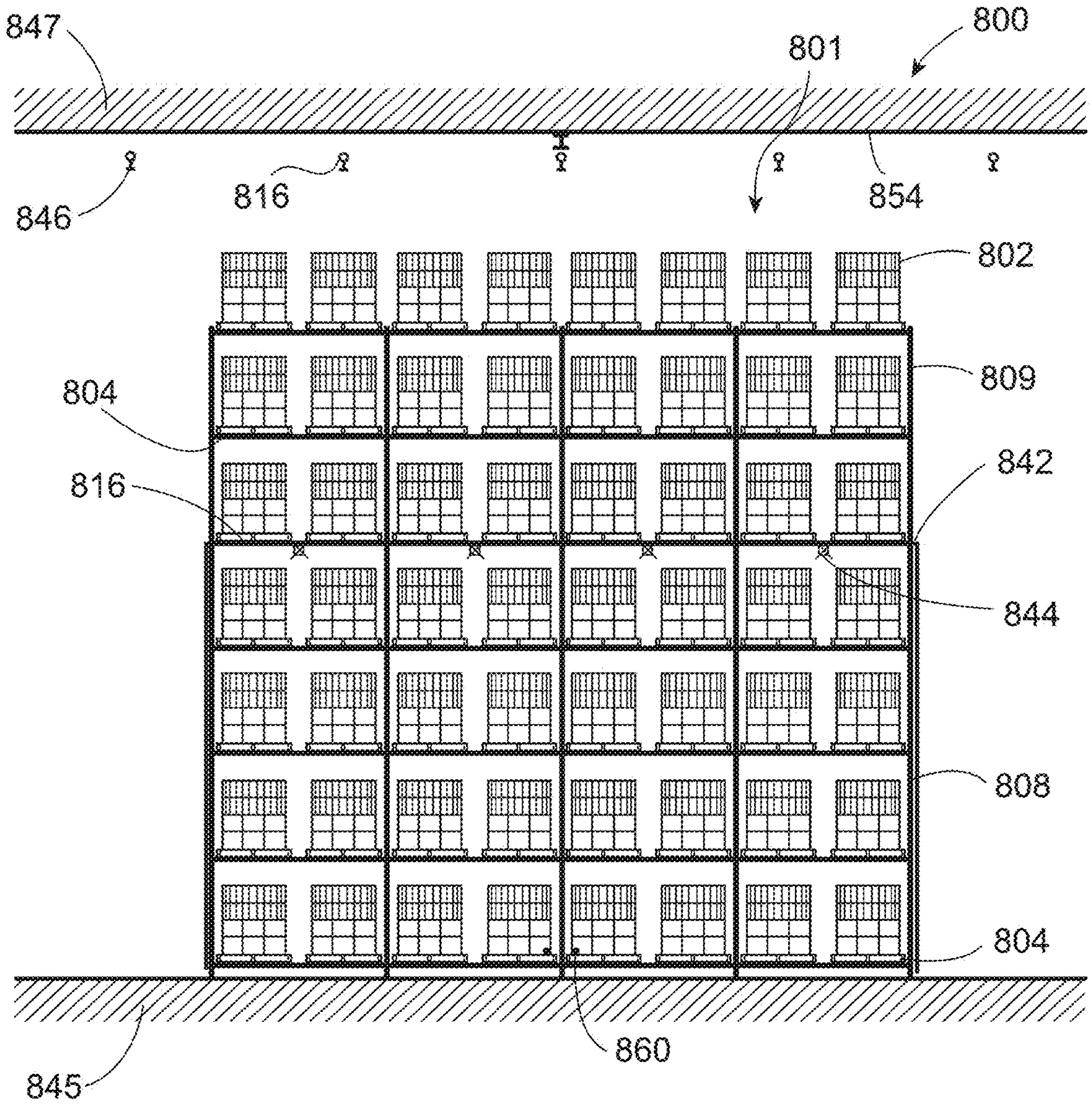
FIG. 8 is an elevation view of a main array and a fire protection system arranged in accordance with an embodiment of the invention.

Fire testing has been conducted for a fire protection sprinkler system 800 arranged in accordance with an aspect of the invention. FIG. 8 shows a side elevation view of the fire protection sprinkler system 800 having a solid horizontal barrier 842 at a height of 20 feet (6.096 meters) above four levels of double row rack storage. A width of the racks 808 is about 33 feet (10.06 meters). Another three levels of rack storage 809 are provided above the solid horizontal barrier 842, so that a height from a top of an uppermost commodity 802 to a floor 845 is about 35 feet (10.67 meters), and a height of a ceiling 847 above the racks 808, 809 is about 40 feet (12.19 meters) from the floor 845. Just below the horizontal barrier 842, a set of rack level fire protection sprinklers 844 is connected to a fluid supply conduit 816, and each rack level fire protection sprinkler 844 is horizontally spaced from an adjacent rack level fire protection sprinkler 844 by about 8 feet (2.44 meters). The horizontal barrier 842 is a solid barrier formed of ⅜ inch (9.53 millimeters) thick plywood.

Figure 9:
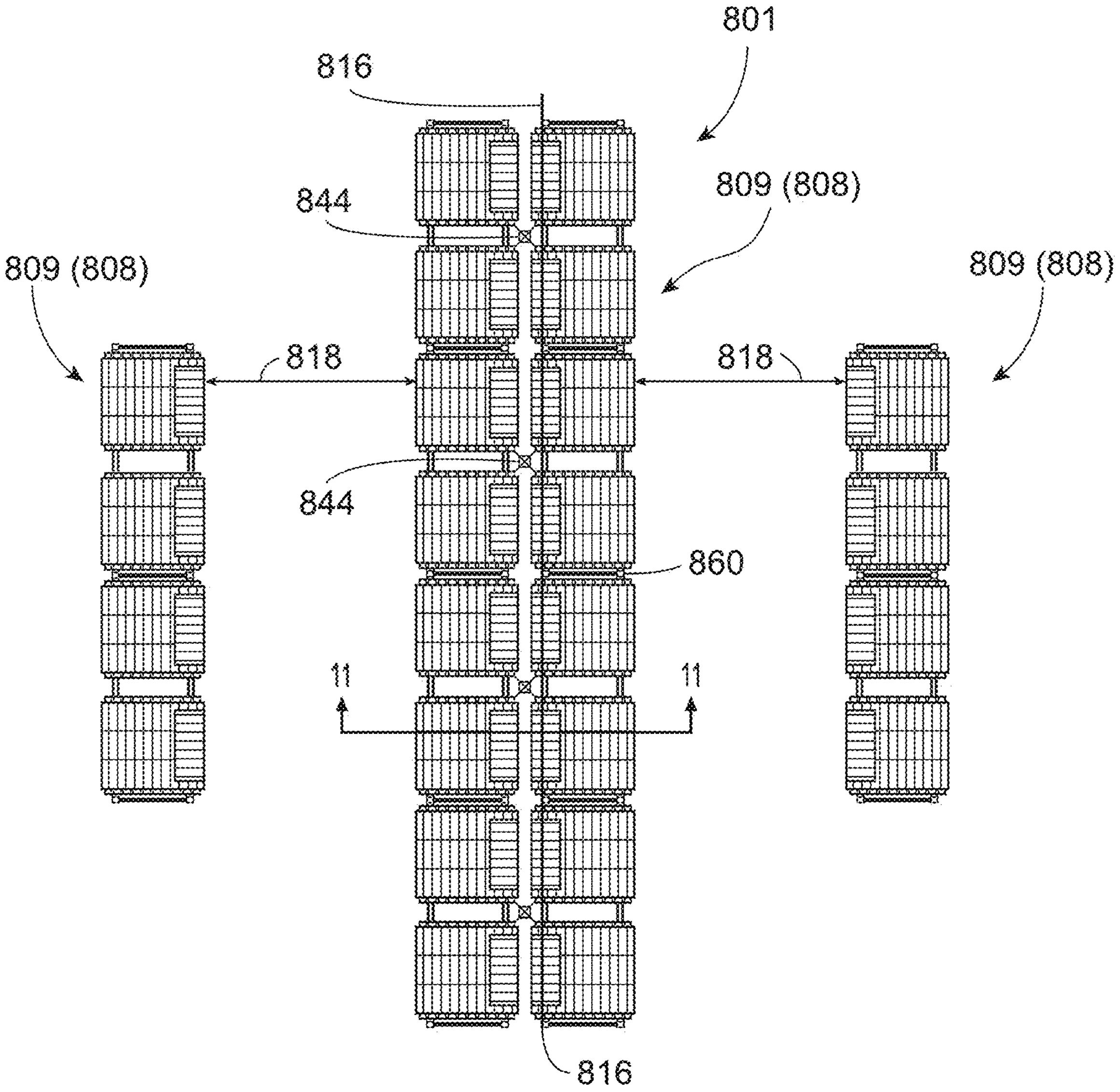
FIG. 9 is a plan view of the main array and fire protection system shown in FIG. 8 between two side arrays separated by aisles.

The racks 808 and 809 are double row racks in which exposed, expanded Group A plastics placed on 2-way entry, hardwood stringer pallets 804 are stored. FIG. 9 shows a plan view of the test configuration of the double row racks 808 and 809. The double row racks 808 and 809 of a main array 801 are spaced from other racks 808 and 809 by aisles 818 that are about 8 feet (2.44 meters) wide. It should be noted that the width of each aisle 818 may be about 2 feet (0.61 meter) or greater in other arrangements. As shown in FIGS. 8 and 9, an ignition source 860 is located at a base of the main array 801 approximately at the midpoint of the width of main array 801 and between two ceiling level fire protection sprinklers 846 and two rack level fire protection sprinklers 844.

The ceiling level sprinklers 846 are fluidly connected to a ceiling fluid supply conduit 854, so that the deflectors of the ceiling level fire protection sprinklers 846 are spaced about 14 inches (355.6 millimeters) from the ceiling 847. The horizontal spacing between the ceiling level fire protection sprinklers 846 is about 10 feet (3.05 meters) along the width of the main array 801. The ceiling level fire protection sprinklers 846 are spaced about 10 feet (3.05 meters) on either side of the midpoint of the width of the main array 801, as shown in FIG. 8. In the example test arrangement, the ceiling level fire protection sprinklers 846 are ESFR pendent fire protection sprinklers having a K-factor of 16.8 gpm/(psi)$^{1/2}$. The temperature rating of the ceiling level fire protection sprinklers 846 is 212 degrees Fahrenheit. The ceiling level fire protection sprinklers 846 are quick response (QR) fire protection sprinklers having a thermal release element that is a fusible solder link type. The nominal discharge density of the ceiling level fire protection sprinklers 846 is 1.19 gpm/square foot (48.49 lpm/square meter) and the nominal discharge pressure is 50 psig (344.74 kPa).

The rack level fire protection sprinklers 844 are fluidly coupled to a 3-inch (76.2 millimeters), schedule 40 fluid supply conduit 816 that is hydraulically separate from the ceiling fluid supply conduit 854 serving the ceiling level fire protection sprinklers 846. The rack level fire protection sprinklers 844 are extended coverage (EC) type fire protection sprinklers oriented in a pendent configuration and having a K-factor of 25.2 gpm/(psi)$^{1/2}$. The deflectors of the rack level fire protection sprinklers 844 are spaced about 9.5 inches (241.3 millimeters) from the top of the commodity 802 directly below the rack level fire protection sprinklers

844. The rack level fire protection sprinklers 844 are quick response (QR) fire protection sprinklers having a thermal release element that is a fusible solder link type. The nominal discharge pressure is 30 psig (206.84 kPa) and the nominal discharge flow rate is 138 gpm (522.39 liters per minute).

Figure 10:
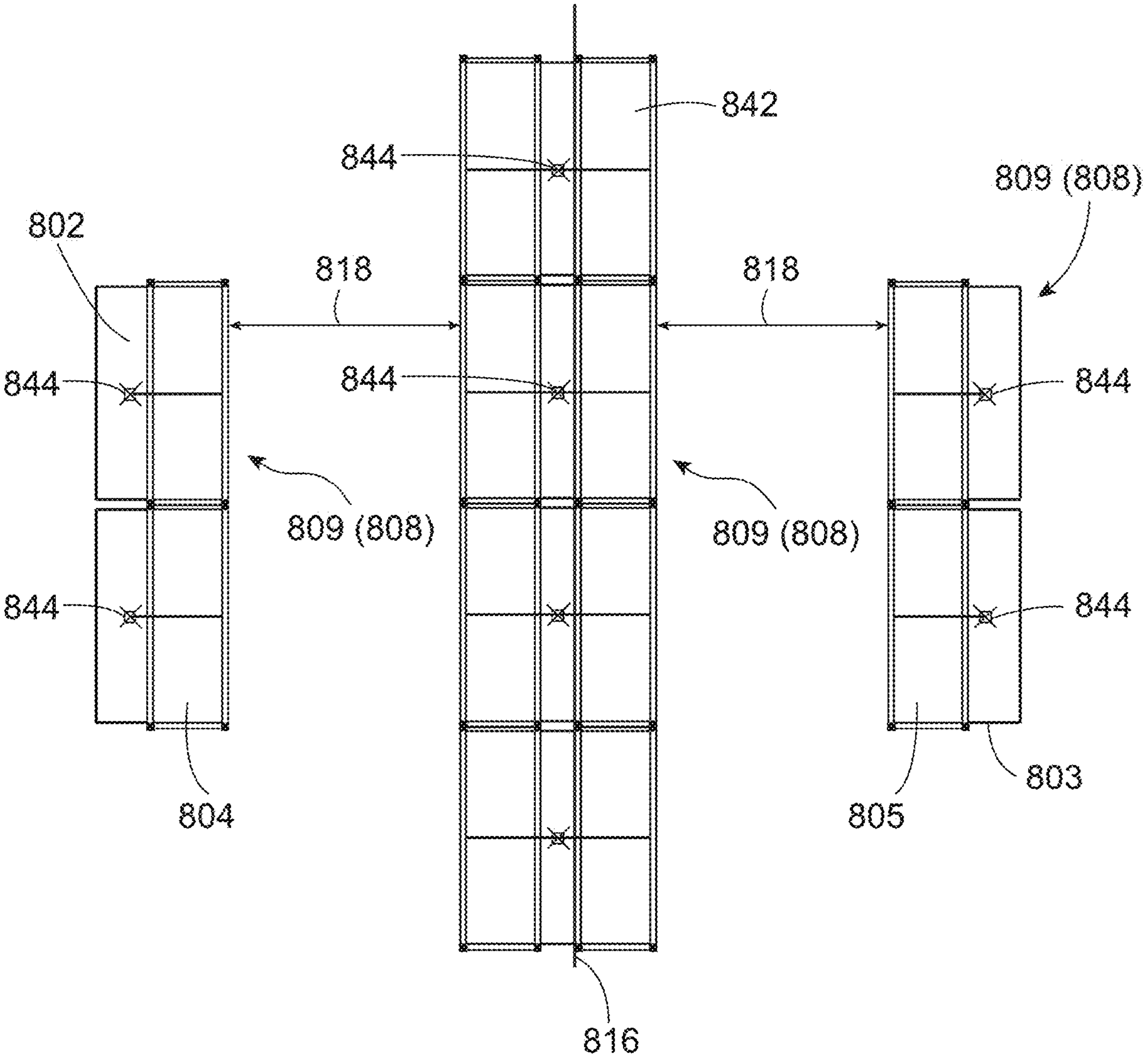
FIG. 10 is a plan view of the main array and fire protection system shown in FIG. 8 with the commodities and rack structure above a horizontal barrier removed for illustration.
Figure 11:
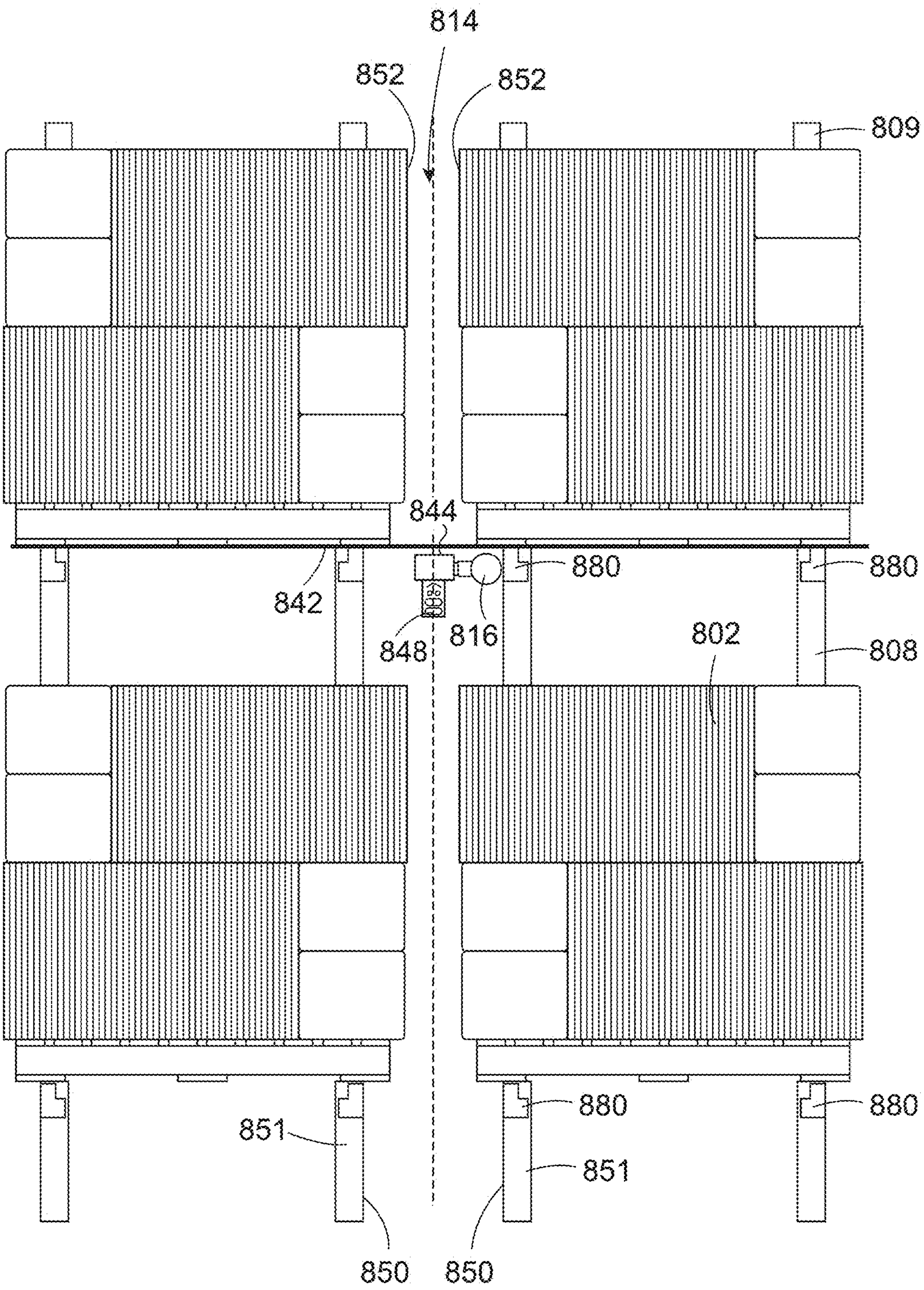
FIG. 11 is an elevation section view of the main array viewed along section line 11-11 in FIG. 9.

FIG. 10 shows details of the arrangement of the solid horizontal barrier 842 of the main array 801 at the 20 foot (6.10 meters) elevation in FIG. 8, as well as solid horizontal barriers 804 and 805, respectively, in arrays 802 and 803. FIG. 11 shows a section view of the main array 801 viewed from section line 11-11 in FIG. 9. Rear faces 850 of rack supports 851 are spaced about 15 inches (381 millimeters), and rear faces 852 of the commodities 802 in the racks 808 and 809 are spaced about 6 inches (152.4 millimeters) apart. The deflector 848 of each of the rack level fire protection sprinklers 844 is approximately centered in a vertical flue space 814 between the racks 808 and 809, and each deflector 848 is spaced about 8 inches (203.2 millimeters) from the uppermost side of the commodity 802. The solid horizontal plywood barrier 842 extends fully across the racks 808 and 809 and the vertical flue space 814. The fluid supply conduit 816 is not disposed below horizontal rack supports 880 of a rack frame of the racks 808 and 809. The deflector 848 of each rack level fire protection sprinkler 844 and/or a portion of a frame of each rack level fire protection sprinkler 844 may protrude below the horizontal rack supports 880 adjacent to the fluid supply conduit 816.

Figure 12:
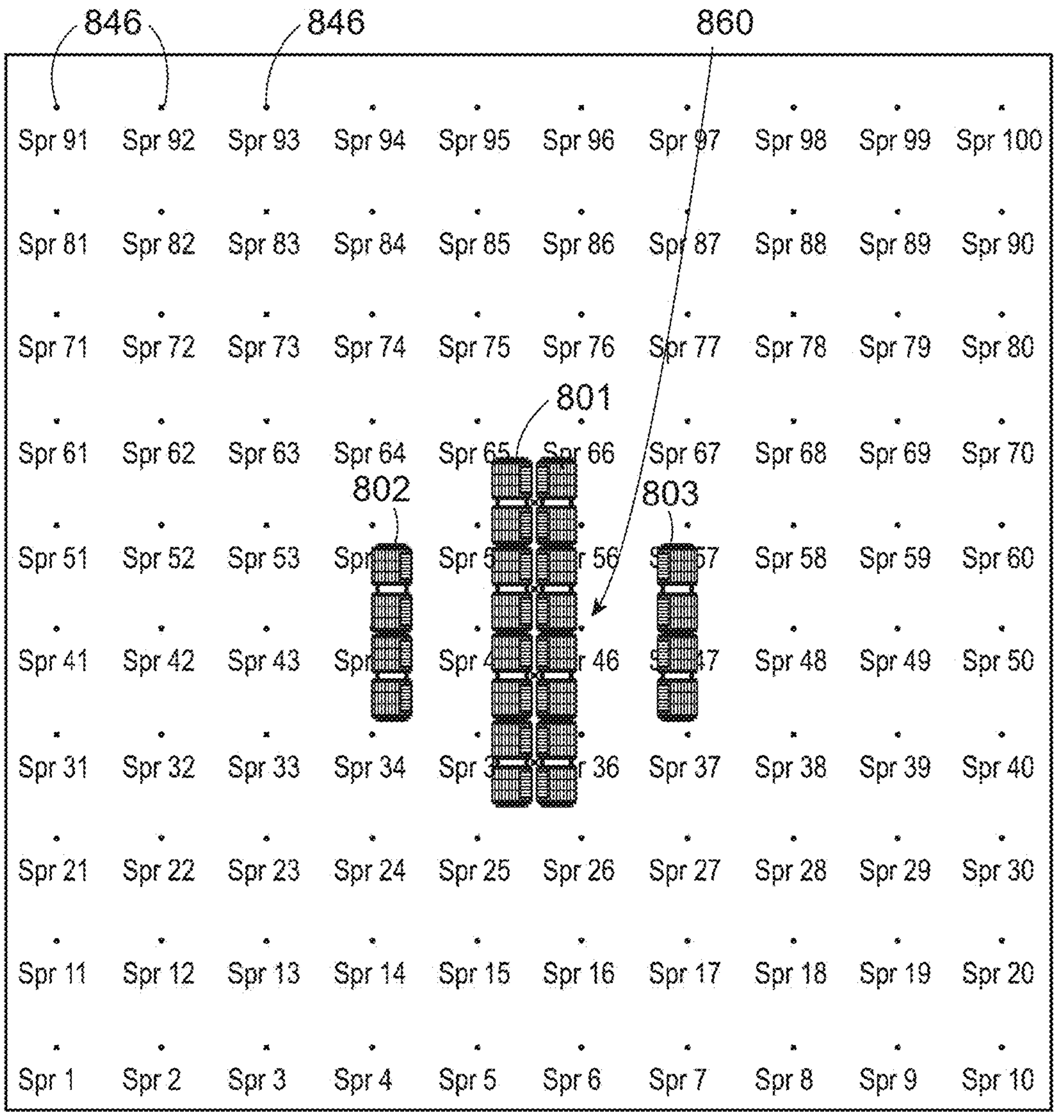
FIG. 12 is a plan view of the main array and fire protection system shown in FIG. 8, and shows an array of ceiling level fire protection sprinklers arranged in accordance with an embodiment of the invention.

FIG. 12 shows a test map of locations of an array of ceiling level fire protection sprinklers 846 disposed above the arrays 801, 802, and 803 where temperature measurements were taken during the testing. The test parameters and results are summarized in Table 1, below.

TABLE 1

| FIRE TEST NUMBER | Test 1 |
|---|---|
| Test Date | August 8, 2012 |
| **Test Parameters** | |
| Storage Type | Double Row Rack |
| Commodity Type | Exposed Expanded Group A Plastic |
| Pallet Type | 2 way entry, stringer, hardwood |
| Nominal Storage Height, ft. (m) | 35 (10.69) |
| Ceiling Height, ft. (m) | 40 (12.19) |
| Nominal Clearance, ft. (m) | 5 (1.52) |
| Aisle Width, ft. (m) | 8 (2.44) |
| Ignition Location | Between 2 Ceiling level and Rack level Fire Protection Sprinklers (Face Fire in Aisle Space) |
| **Ceiling level Fire Protection Sprinkler System** | |
| Sprinkler Type | K = 16.8 ESFR Pendent |
| Deflector to Ceiling, in. (mm) | 14 (355.6) |
| Ceiling level Fire Protection Sprinkler Spacing, sprinkler by branchline ft. by ft. (m by m) | 10 by 10 (3.05 by 3.05) |
| Temperature Rating, ° F. | 212 |
| Sprinkler Response Type | QR (link) |
| Nominal Sprinkler Discharge Coefficient K, gpm/(psi)$^{1/2}$ | 16.8 |
| Nominal Discharge Density, gpm/ft$^2$ (Ipm/m$^2$) | 1.19 (48.49) |
| Nominal Discharge Pressure, psig (kPa) | 50 (344.74) |
| **Rack level Fire Protection Sprinkler System** | |
| Sprinkler Type | K = 25.2 Extended Coverage Pendent |
| Deflector to Commodity, in. (mm) | 9.5 (241.3) |
| Sprinkler Spacing, ft. (m) | 8.25 (2.51) (centered on the rack bays) |
| Temperature Rating, ° F. | 212 |
| Sprinkler Response Type | QR (link) |

TABLE 1-continued

| | |
|---|---|
| Nominal Sprinkler Discharge Coefficient K, gpm/(psi)1/2 | 25.2 |
| Nominal Discharge Pressure, psig (kPa) | 30 (206.84) |
| Nominal Discharge Flowrate, gpm (1pm) | 138 (522.39) |
| Test Results | |
| Length of Test, minutes | 31 |
| Peak Gas Temperature at Ceiling Above Ignition, ° F. | 410 |
| Maximum 1 minute Average Gas Temperature at Ceiling Above Ignition, ° F. | 218 |
| Peak Steel Temperature at Ceiling Above Ignition, ° F. | 102 |
| Maximum 1 minute Average Steel Temperature at Ceiling Above Ignition, ° F. | 102 |
| Fire Travel to Extremities of Test Array | No |
| Ceiling level Fire Protection Sprinkler System | |
| First Sprinkler Operation Time, min:sec | 1:02 |
| Last Sprinkler Operation Time, min:sec | 1:02 |
| Number of Operated Sprinklers | 1 |
| Rack level Fire Protection Sprinkler System | |
| First Sprinkler Operation Time, min:sec | 0:49 (East Central Sprinkler) |
| Last Sprinkler Operation Time, min:sec | 0:52 (West Central Sprinkler |
| Number of Operated Sprinklers | 2 (out of 4 active in main array) |

Figure 14:
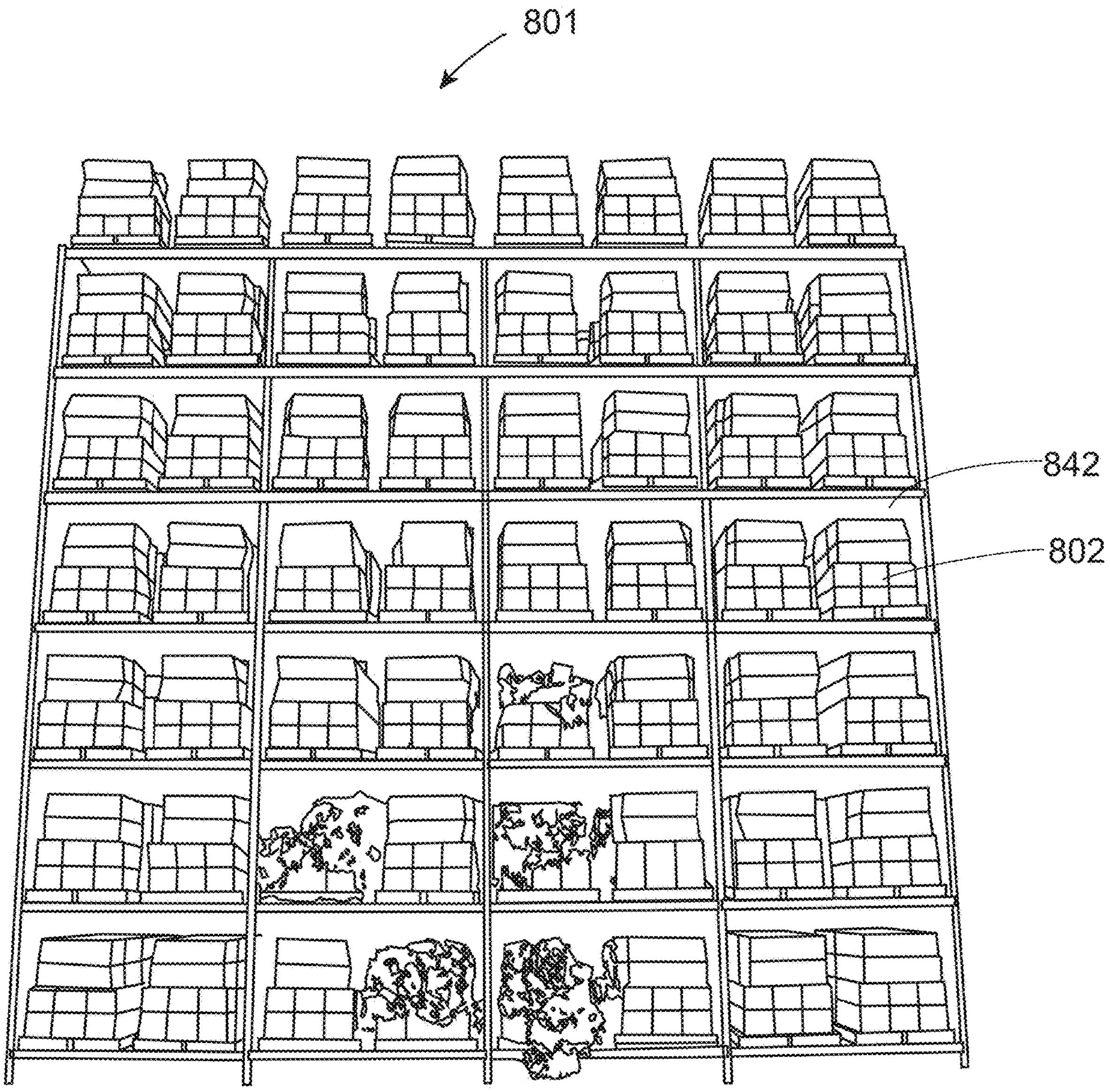
FIGS. 14 and 15 are side elevation views of the main array shown in FIG. 8 showing damage that occurred as a result of the test conducted.
Figure 15:
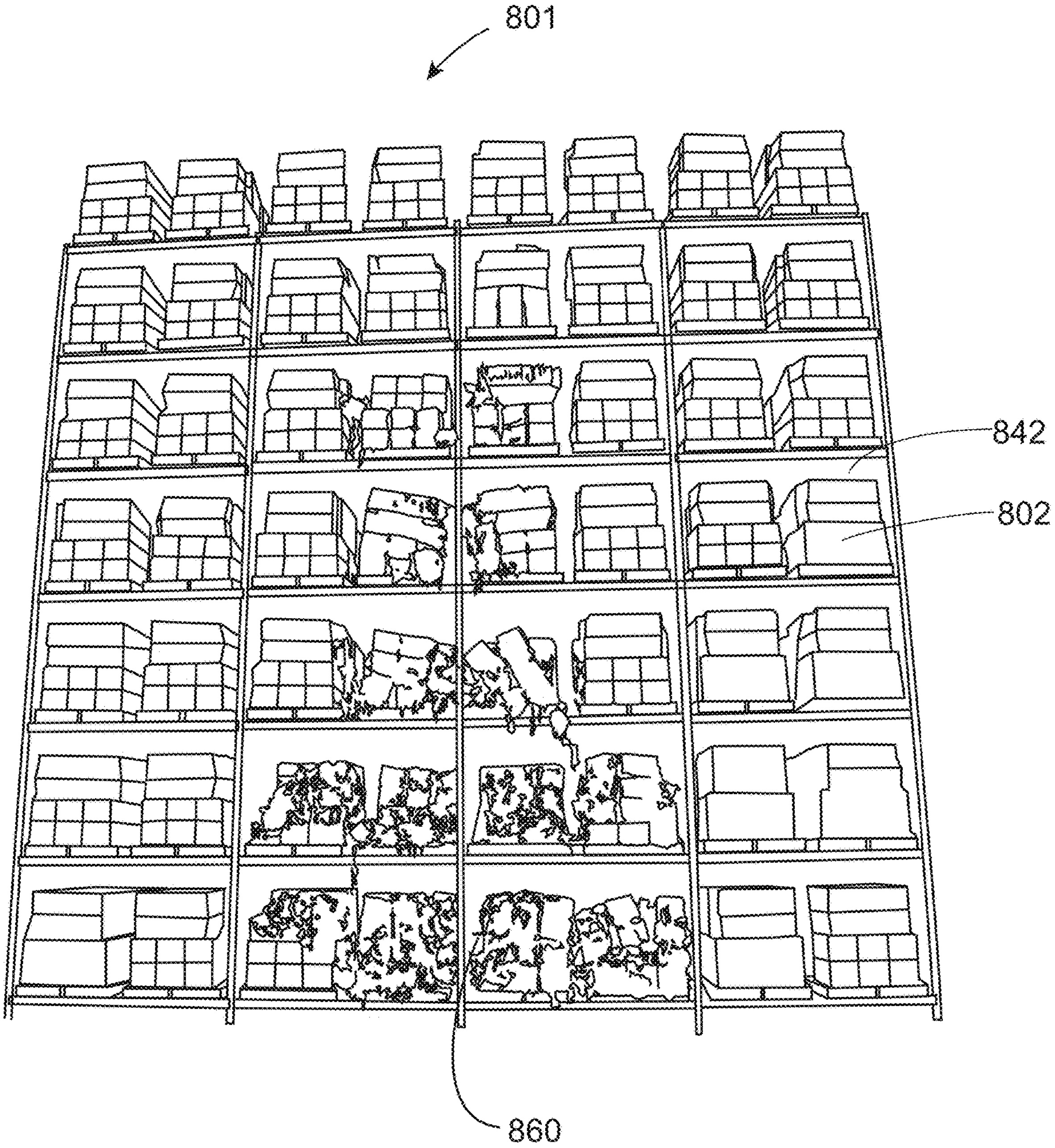

FIG. 13 shows maximum temperatures that were recorded during the test at the locations shown in FIG. 12, and also shows activation time of the ceiling level fire protection sprinklers 846. As shown by the testing, during a fire condition, only two rack level fire protection sprinklers 844 out of four rack level fire protection sprinklers 844 operated during the fire, and only one ceiling level fire protection sprinkler 846 operated. FIG. 14 shows a view of the pattern of damage to the main array 801 from one side, and FIG. 15 shows a view of damage to the main array 801 from a side opposite to the side shown in FIG. 14.

Conventional in-rack fire protection sprinkler systems are designed such that, in the event of a fire, up to eight fire protection sprinklers may operate. The fire protection sprinkler system described in accordance with the invention is constructed to reduce the number of opened fire protection sprinklers to five or fewer, which reduces the hydraulic demand of the fire protection sprinkler system in the event of a fire. While the fire protection sprinkler system described herein can be constructed for a new rack storage installation, it will be appreciated by those of ordinary skill in the art that the system can be implemented to retrofit existing fire protection sprinkler systems for rack storage by incorporating rack level fire protection sprinklers into an existing rack storage fire protection sprinkler system.

Fire testing was also conducted for a fire protection sprinkler system 900 arranged in accordance with an aspect of the invention. Table 2, below, summarizes the details of the testing and the arrangement of the fire protection sprinkler system 900.

TABLE 2

| Test Parameters | |
|---|---|
| Storage Type | Double Row Rack |
| Commodity Type | Cartoned Unexpanded Group A Plastic |
| Pallet Type | 2 Way Entry, Stringer, Hardwood |
| Nominal Storage Height, ft. (m) | 43 (13.11) |
| Ceiling Height, ft. (m) | 48 (14.63) |
| Nominal Clearance, ft. (m) | 5 (1.52) |
| Aisle Width, ft. (m) | 8 (2.44) |
| Ignition Location | Between 2 Ceiling level and Rack level Fire Protection Sprinklers (Face of Commodity in Aisle Space) |
| Ceiling level Fire Protection Sprinkler System | |
| Sprinkler Type | K = 25.2 Extended Coverage Pendent |
| Deflector to Ceiling, in. (mm) | 14 (355.6) |
| Ceiling level Sprinkler Spacing, sprinkler by branchline ft. by ft. (m by m) | 14 by 14 (4.27 by 4.27) |
| Temperature Rating, ° F. | 212 |
| Sprinkler Response Type | QR (link) |
| Nominal Sprinkler Discharge Coefficient K, gpm/(psi)$^{1/2}$ | 25.2 |
| Nominal Discharge Density, gpm/ft$^2$ (Ipm/m$^2$) | 0.7 (28.52) |
| Nominal Discharge Pressure, psig (kPa) | 30 (206.84) |
| Rack level Fire Protection Sprinkler System | |
| Sprinkler Type | K= 25.2 Extended Coverage Pendent |
| Deflector to Bottom of Solid Horizontal Barrier, in. (mm) | 7.5 (190.5) |

TABLE 2-continued

| | |
|---|---|
| Sprinkler Spacing, ft. (m) | 8.25 (2.51) (centered on the rack bays) |
| Temperature Rating, ° F. | 212 |
| Sprinkler Response Type | QR (link) |
| Nominal Sprinkler Discharge Coefficient K, gpm/(psi)1/2 | 25.2 |
| Nominal Discharge Pressure, psig (kPa) | 30 (206.84) |
| Test Results | |
| Length of Test, minutes | 34 |
| Peak Gas Temperature at Ceiling Above Ignition, ° F. | 722 |
| Maximum 1 minute Average Gas Temperature at Ceiling Above Ignition, ° F. | 353 |
| Peak Steel Temperature at Ceiling Above Ignition, ° F. | 152 |
| Maximum 1 minute Average Steel Temperature at Ceiling Above Ignition, ° F. | 150 |
| Fire Travel to Extremities of Test Array | No |
| Ignition of Target Commodity | No |
| Ceiling level Fire Protection Sprinkler System | |
| First Sprinkler Operation Time, min:sec | 3:01 |
| Last Sprinkler Operation Time, min:sec | 3:01 |
| Number of Operated Sprinklers | 1 |
| Rack level Fire Protection Sprinkler System | |
| First Sprinkler Operation Time, min:sec | 2:53 (West Central Sprinkler) |
| Last Sprinkler Operation Time, min:sec | 2:59 (East Central Sprinkler) |
| Number of Operated Sprinklers | 2 (out of 4 active in main array) |

In contrast to the fire protection sprinkler system 800, the fire protection sprinkler system 900 employs extended coverage fire protection sprinklers as ceiling level fire protection sprinklers 946. The ceiling level fire protection sprinklers 946 have a nominal K-factor of 25.2 gpm/(psi)$^{1/2}$ and are constructed as Model N252 EC fire protection sprinklers manufactured by The Reliable Automatic Sprinkler Co. The fire protection sprinkler system 900 also includes rack level fire protection sprinklers 944 that are the same type of fire protection sprinkler as the ceiling level fire protection sprinklers 946.

Figure 16:
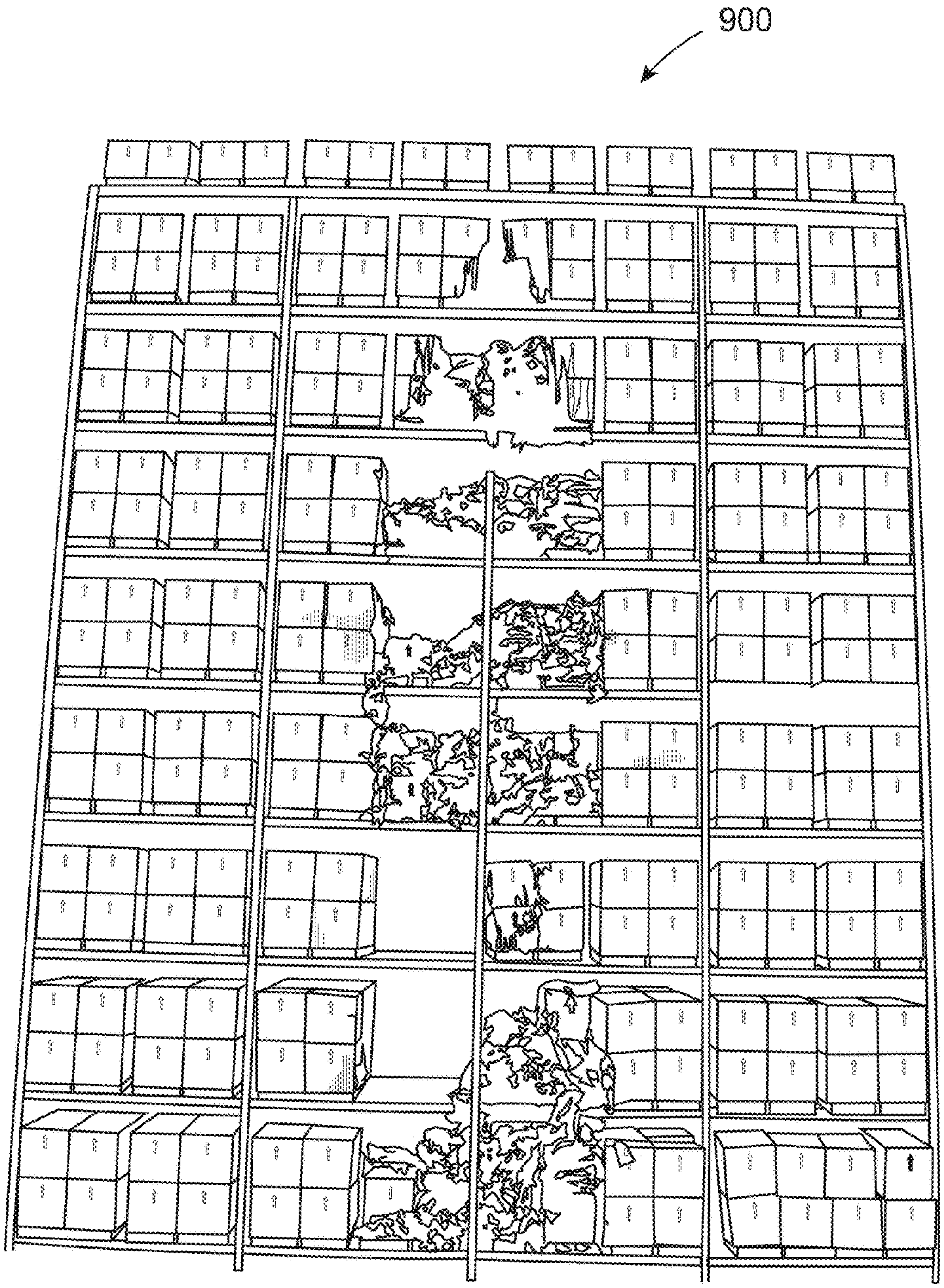
FIG. 16 is a side elevation view of the north side of a main array showing damage that occurred as a result of a test conducted on a fire protection system constructed in accordance with an embodiment of the invention.
Figure 17:
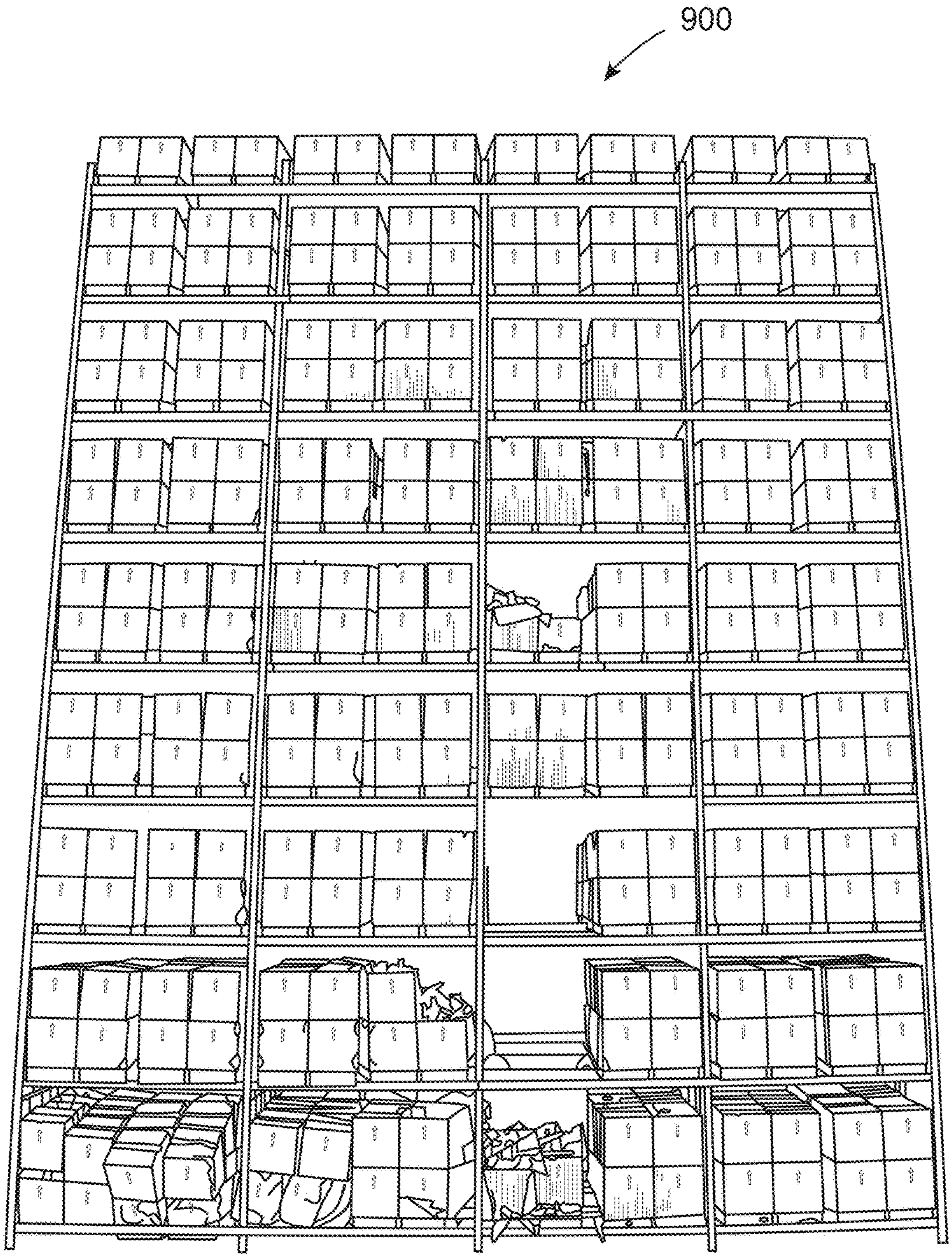
FIG. 17 is a side elevation view of the south side of the main array shown in FIG. 16.

FIG. 16 shows a photograph of the north side of a main array 901 protected by the fire protection sprinkler system 900 and the damage caused by the fire testing of the fire protection sprinkler system 900. FIG. 17 shows a photograph of the south side of the main array 901 and the damage caused by the fire testing of the fire protection sprinkler system 900. With an aisle width 918 of eight feet (2.44 meters), no damage was observed to the commodities 902 in either of the two racks spaced from the main array 901 in testing the fire protection sprinkler system 900. Testing of the fire protection sprinkler system 900 confirmed that the growth of the fire was substantially vertical.

Fire testing has been conducted for a fire protection sprinkler system 1000 arranged in accordance with an aspect of the invention. Table 3, below, summarizes the details of the testing and the arrangement of the fire protection sprinkler system 1000.

TABLE 3

| Test Parameters | |
|---|---|
| Storage Type | Double Row Rack |
| Commodity Type | Cartoned Unexpanded Group A Plastic (Polystyrene Cups in Corrugated Containers) |
| Pallet Type | 2 way entry, stringer, hardwood |
| Horizontal Barrier Within Rach | 3/8 inch (9.53 mm) Plywood at 20 ft. (6.10 m) and 40 ft. (12.19 m) Elevation |
| Nominal Storage Height, ft. (m) | 43 (13.11) |
| Ceiling Height, ft. (m) | 48 (14.63) |
| Nominal Clearance, ft. (m) | 5 (1.52) |
| Aisle Width, ft. (m) | 4 (1.22) |
| Ignition Location | Between 2 Sprinklers (offset in transverse flue space) |
| Ceiling level Fire Protection Sprinkler System (Initially Dry-Activated after significant fire load at the ceiling) | |
| Sprinkler Type | K = 25.2 Extended Coverage Pendent |
| Deflector to Ceiling, in. (mm) | 14 (355.6) |
| Ceiling level Sprinkler Spacing, sprinkler by branchline ft. by ft. (m by m) | 14 by 14 (4.27 by 4.27) |
| Temperature Rating, ° F. | 212 |
| Sprinkler Response Type | QR (link) |
| gpm/(psi)1/2 | |
| Nominal Sprinkler Discharge Coefficient K, gpm/(psi)1/2 | 25.2 |

TABLE 3-continued

| | |
|---|---|
| Nominal Discharge Density, gpm/ft2 (lpm/m2) | 0.7 (28.52) |
| Nominal Discharge Pressure, psig (kPa) | 30 (206.84) |
| Rack level Fire Protection Sprinkler System (at nominal 20 ft. (6.10 m) and 40 ft. (12.19 m) levels) | |
| Sprinkler Type | K= 25.2 Extended Coverage Pendent |
| Deflector to Commodity, in. (mm) | 8 (203.2) (nominal) |
| Sprinkler Spacing, ft. (m) | 8.25 (2.51) (centered on the rack bays) (4 sprinklers, centered on the bay of commodity) |
| Temperature Rating, ° F. | 165 |
| Sprinkler Response Type | QR (link) |
| Nominal Sprinkler Discharge Coefficient K, gpm/(psi)$^{1/2}$ | 25.2 |
| Nominal Discharge Pressure, psig (kPa) | 30 (206.84) (at 40 ft. (12.19 m) elevation) 39 (at 20 ft. (6.10 m) elevation) |
| Nominal Discharge Flowrate, gpm (lpm) | 138 (522.39) (at 40 ft. (12.19 m) elevation) 157 (594.31) (at 20 ft. (6.10 m) elevation) |
| Test Results | |
| Length of Test, minutes | 60 |
| Peak Gas Temperature at Ceiling Above Ignition, ° F. | 1583 |
| Maximum 1 minute Average Gas Temperature at Ceiling Above Ignition, ° F. | 1093 |
| Peak Steel Temperature at Ceiling Above Ignition, ° F. | 450 |
| Maximum 1 minute Average Steel Temperature at Ceiling Above Ignition, ° F. | 445 |
| Fire Travel to Extremities of Test Array | No |
| Ignition of Target Commodity | No |
| Ceiling level Fire Protection Sprinkler System (Initial Operating Time without Water)-Water Began Discharging 21 minutes 15 seconds after Ignition | |
| First Sprinkler Operation Time, min:sec | 20:40 |
| Last Sprinkler Operation Time, min:sec | 21:15 |
| Number of Operated Sprinklers | 3 |
| Rack level Fire Protection Sprinkler System | |
| First Sprinkler Operation Time, min:sec | 1:13 (East Central Sprinkler 20 ft. (6.10 m) Elevation) |
| Last Sprinkler Operation Time, min:sec | 13:40 (East Central Sprinkler-40 ft. (12.19 m) Elevation) |
| Number of Operated Sprinklers | 5 (out of 8 active in main array) No operation of Target Rack level Sprinklers |

In contrast to the testing of the fire protection sprinkler system 800 and the fire protection sprinkler system 900, testing of the fire protection sprinkler system 1000 was performed in a main array 1001 and two other arrays having two solid horizontal barriers, a lower barrier at an elevation of 20 feet (6.10 meters), and an upper barrier at an elevation of 40 feet (12.19 meters). In addition, in contrast to the testing of the fire protection sprinkler system 800 and the fire protection sprinkler system 900, an aisle width 1018 between the main array 1001 and the other two arrays was four feet (1.22 meters) instead of eight feet (2.44 meters), as in the test arrangement of the fire protection sprinkler systems 800 and 900.

The fire protection sprinkler system 1000 includes extended coverage fire protection sprinklers for the ceiling level fire protection sprinklers 1046 and the rack level fire protection sprinklers 1044 having a nominal K-factor of 25.2 gpm/(psi)$^{1/2}$ and are constructed as Model N252 EC fire protection sprinklers manufactured by The Reliable Automatic Sprinkler Co., Inc.

Figure 18:
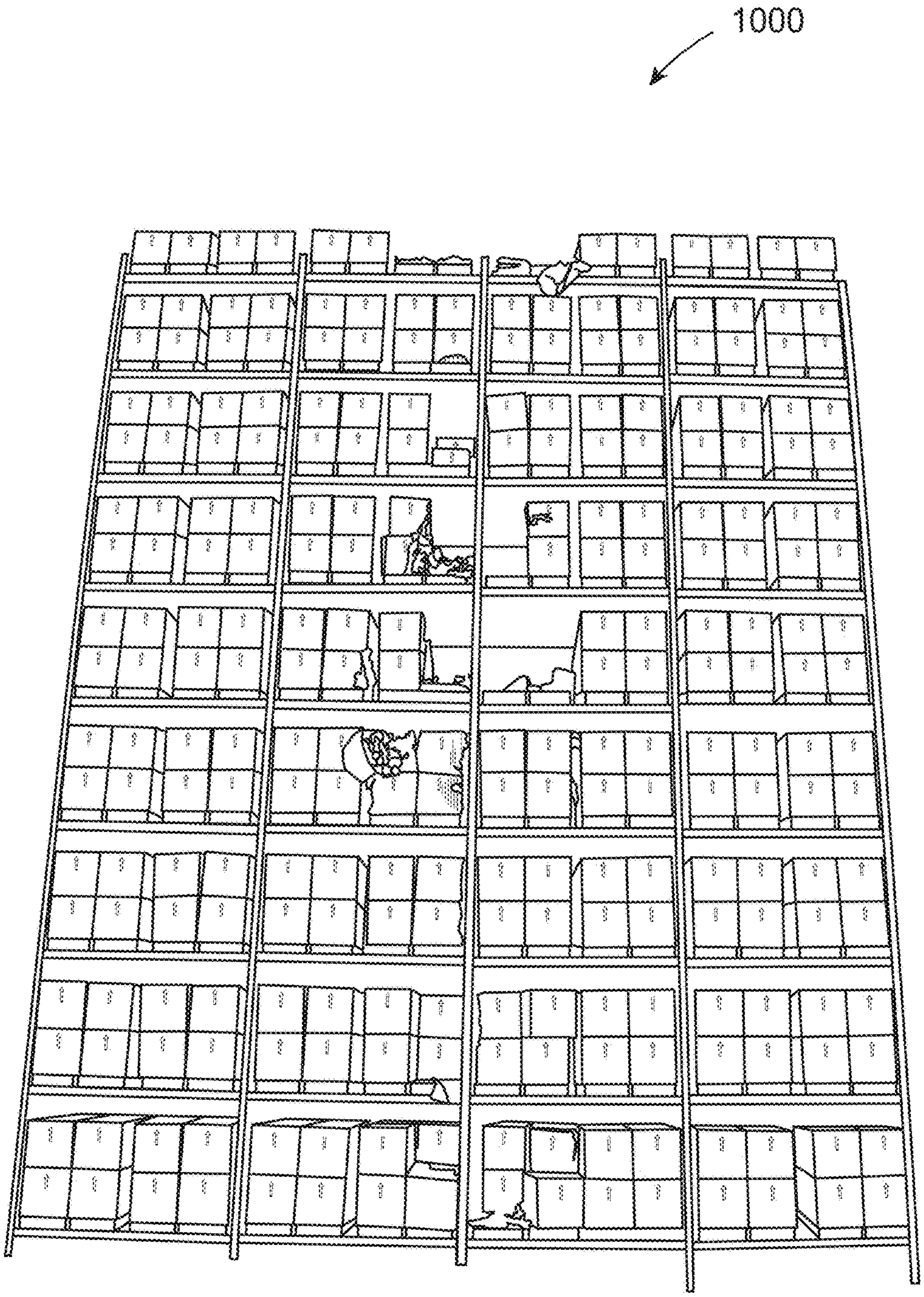
FIG. 18 is a side elevation view of the north side of a main array showing damage that occurred as a result of a test conducted on a fire protection system constructed in accordance with an embodiment of the invention.
Figure 19:
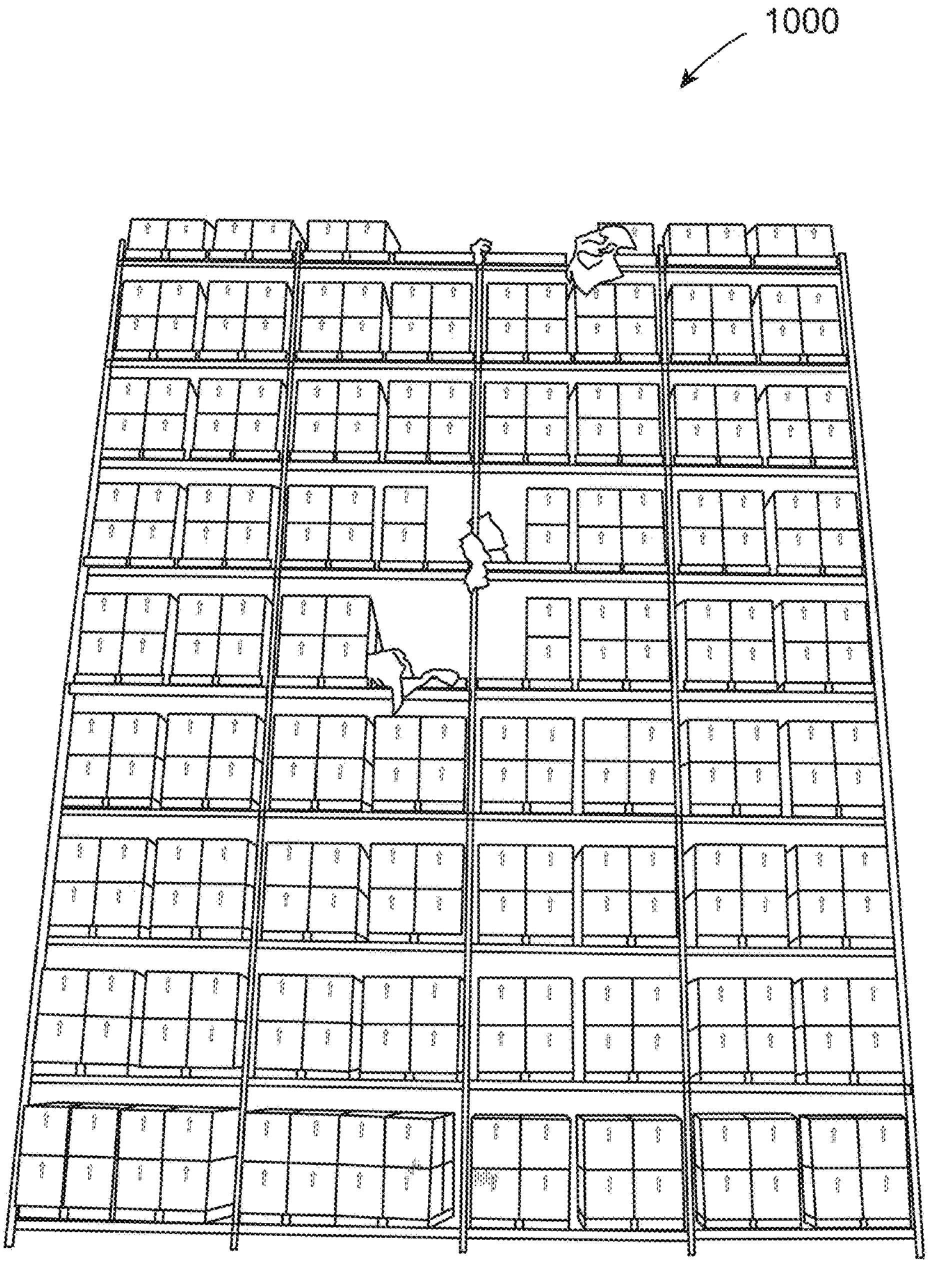
FIG. 19 is a side elevation view of the south side of the main array shown in FIG. 18.

FIG. 18 shows a photograph of the north side of the main array 1001 protected by the fire protection sprinkler system 1000 and the damage caused by the fire testing of the fire protection sprinkler system 1000. FIG. 19 shows a photograph of the south side of the main array 1001 and the damage caused by the fire testing of the fire protection sprinkler system 1000. With an aisle width 1018 of four feet (1.22 meters), no damage was observed to the commodities 1002 in either of the two racks spaced from the main array 1001 in testing the fire protection sprinkler system 1000. Testing of the fire protection sprinkler system 1000 confirmed that the growth of the fire was substantially vertical.

While the invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

We claim:

1. A rack and fire protection sprinkler system comprising:

(A) a first plurality of adjoining racks having a vertical flue space provided between a pair of adjacent racks of the first plurality of adjoining racks, with commodities being stored on the racks;

(B) a second plurality of adjoining racks having a vertical flue space provided between a pair of adjacent racks of the second plurality of adjoining racks, the second plurality of adjoining racks being spaced from the first plurality of adjoining racks by an aisle width, with commodities being stored on the racks;

(C) at least one first unitary horizontal barrier that covers (i) a rack, of the first plurality of adjoining racks, (ii) another rack, of the first plurality of adjoining racks, and (iii) the vertical flue space between the rack and the other rack, of the first plurality of adjoining racks, the at least one unitary first horizontal barrier being provided at a first predetermined height, having a predetermined width, and having a depth that is at least equal to a sum of (i) a depth of the rack;

(D) at least one second unitary horizontal barrier that covers (i) a rack, of the second plurality of adjoining racks, (ii) another rack, of the second plurality of adjoining racks, and (iii) the vertical flue space between the rack and the other rack, of the second plurality of adjoining racks, the at least one second horizontal barrier being provided at a second predetermined height, having a predetermined width, and a depth that is at least equal to a sum of (i) a depth of the rack, of the second plurality of adjoining racks, (ii) a depth of the other rack, of the second plurality of adjoining racks, and (iii) a depth of the vertical flue; and (E) a fire protection sprinkler system for the protection of the commodities stored on the first plurality of adjoining racks and the second plurality of adjoining racks, the fire protection sprinkler system comprising:

(a) a first fluid supply conduit, associated with the first plurality of adjoining racks, configured to deliver a fire protection fluid received from a fire protection fluid source;

(b) at least one first rack level fire protection sprinkler connected to the first fluid supply conduit, the at least one first rack level sprinkler (i) being disposed in the vertical flue space below the at least one unitary first horizontal barrier, and (ii) being vertically spaced from the commodities stored on the rack and the other rack, of the first plurality of adjoining racks, covered by the at least one unitary first horizontal barrier;

(c) at least one ceiling level fire protection sprinkler provided above the at least one unitary first horizontal barrier and connected to the first fluid suppl conduit;

(d) a second fluid supply conduit, associated with the second plurality of adjoining racks, configured to deliver the fire protection fluid received from the fire protection fluid source; and (e) at least one second rack level fire protection sprinkler connected to the second fluid supply conduit associated with the second plurality of adjoining racks, the at least one second rack level sprinkler (i) being disposed below the at least one second horizontal barrier, and being vertically spaced from the commodities stored on the rack and the other rack, of the second plurality of adjoining racks, covered by the at least one second unitary horizontal barrier.

2. The rack and fire protection sprinkler system according to claim 1, wherein the aisle width is at least 4 feet (1.22 meters).

3. The rack and fire protection sprinkler system according to claim 1, wherein the first predetermined height at which the at least one first horizontal barrier is provided and the second predetermined height at which the at least one second horizontal barrier is provided are between 10 feet and 30 feet (3.05 meters to 9.14 meters).

4. The rack and fire protection sprinkler system according to claim 1, wherein each of the at least one first rack level sprinkler and each of the at least one second rack level sprinkler are one of (i) an extended coverage sprinkler, (ii) a storage sprinkler, or (iii) an extended coverage storage sprinkler.

5. The rack and fire protection sprinkler system according to claim 1, wherein the at least one first rack level sprinkler includes two or more first rack level sprinklers that are arranged in a row at a horizontal spacing of at least about 8 feet (2.44 meters), and the at least one second rack level sprinkler includes two or more second rack level sprinklers that are arranged in a row at a horizontal spacing of at least about 8 feet (2.44 meters).

6. The rack and fire protection sprinkler system according to claim 1, wherein each of the at least one first rack level sprinkler and the at least one second rack level sprinkler is provided at a center of a length of each rack, of the first plurality of racks and the second plurality of racks.

7. The rack and fire protection sprinkler system according to claim 1, wherein each of the at least one first rack level sprinkler and the at least one second rack level sprinkler comprise:

(1) a body having an inlet connected to a fluid supply conduit, which is a corresponding one of the first fluid supply conduit and the second fluid supply conduit, within the vertical flue space, and an outlet defining an outlet orifice;

(2) a seal cap that seals the outlet orifice;

(3) a frame extending from the body;

(4) a deflector connected to the frame; and (5) a thermally responsive element supported between the seal cap and the frame, the thermally responsive element urging the seal cap that seals the outlet orifice when the rack level sprinkler is in an inactivated state, wherein, when the first predetermined height at which the at least one first horizontal barrier is provided and the second predetermined height at which the at least one second horizontal barrier is provided are up to about 30 feet (9.14 meters) and each of the at least one first rack level sprinkler and the at least one second rack level sprinkler is positioned in the vertical flue space between the stored commodities and the at least one first horizontal barrier, and in the vertical flue space between the stored commodities and the at least one second horizontal barrier, respectively, the at least one first rack level sprinkler and the at least one second rack level sprinkler deliver the fire protection fluid over the stored commodities when the at least one first rack level sprinkler and the at least one second rack level sprinkler are in an activated state.

8. The rack and fire protection sprinkler system according to claim 1, wherein the first fluid supply conduit is disposed at or above a rack support frame of the first plurality of adjoining racks that is adjacent to the first fluid supply conduit, and the second fluid supply conduit is disposed at or above a rack support frame of the second plurality of adjoining racks that is adjacent to the second fluid supply conduit.

9. The rack and fire protection sprinkler system according to claim 1, wherein each of the at least one first rack level sprinkler and the at least one second rack level sprinkler comprises:

(1) a frame; and (2) a deflector connected to the frame, wherein only the deflector and a portion of the frame of each of the at least one first rack level sprinkler protrude below a rack support frame of the first plurality of adjoining racks that is adjacent to the first fluid supply conduit, and only the deflector and a portion of the frame of each of the at least one second rack level sprinkler protrude below a rack support frame of the second plurality of adjoining racks that is adjacent to the second fluid supply conduit.

10. The rack and fire protection sprinkler system according to claim 1, wherein each of the at least one first rack level sprinkler and the at least one second rack level sprinkler is one of a pendent type sprinkler or a horizontal sidewall sprinkler.

11. The rack and fire protection sprinkler system according to claim 1, wherein the K-factor of each of the at least one first rack level sprinkler and the at least one second rack level sprinkler is between 11.2 and 25.2 gpm/$(psi)^{1/2}$ inclusive.

12. The rack and fire protection sprinkler system according to claim 1, wherein the first fluid supply conduit delivers the fire protection fluid to the at least one first rack level sprinkler at a minimum pressure of about 7 psig (48.26 kPa), and the second fluid supply conduit delivers the fire protection fluid to the at least one second rack level sprinkler at a minimum pressure of about 7 psig (48.26 kPa).

13. The rack and fire protection sprinkler system according to claim 1, wherein the at least one first rack level sprinkler includes at least two first rack level sprinklers, and the at least one second rack level sprinkler includes at least two second rack level sprinklers, and the K-factor of each rack level sprinkler, of the at least two first rack level sprinklers and the at least two second rack level sprinklers, is selected based on the proximity of the rack level sprinkler to a fire hazard, the K-factor being a constant.

14. The rack and fire protection sprinkler system according to claim 1, wherein the first plurality of adjoining racks includes any one of single racks, double racks, multiple-row racks, or racks for automatic rack systems.

15. The rack and fire protection sprinkler system according to claim 1, wherein the second plurality of adjoining racks includes any one of single racks, double racks, multiple-row racks, or racks for automatic rack systems.

16. The rack and fire protection sprinkler system according to claim 1, wherein the commodities include Class I-IV hazards, Group A cartoned and exposed plastics (expanded and unexpanded), flammable liquids, tires, roll paper, and aerosols.

17. The rack and fire protection sprinkler system according to claim 1, wherein the at least one first unitary horizontal barrier is a solid sheet.

18. The rack and fire protection sprinkler system according to claim 1, wherein the at least one first unitary horizontal barrier is a sheet having one or more apertures.

19. The rack and fire protection sprinkler system according to claim 1, wherein the at least one second unitary horizontal barrier is a solid sheet.

20. The rack and fire protection sprinkler system according to claim 1, wherein the at least one second unitary horizontal barrier is a sheet having one or more apertures.

21. The rack and fire protection sprinkler system according to claim 1, wherein the at least one rack level sprinkler includes at least two first rack level sprinklers, and the at least one second rack level sprinkler includes at least two second rack level sprinklers, and the K-factor of each of the at least two first rack level sprinklers and the at least two second rack level sprinklers is selected based on the vertical position of each of the at least two first rack level sprinklers and the at least two second rack level sprinklers, respectively, the K-factor being a constant.

22. The rack and fire protection sprinkler system according to claim 21, wherein the K-factor is selected such that the greater the height of a rack level sprinkler, of the at least two first rack level sprinklers and the at least two second rack level sprinklers, the greater the K-factor of the rack level sprinkler.

23. The rack and fire protection sprinkler system according to claim 21, wherein the K-factor is selected such that the greater the height of a rack level sprinkler, of the at least two rack level sprinklers, the lower the K-factor of the rack level sprinkler.

24. The rack and fire protection sprinkler system according to claim 1, wherein the fire protection sprinkler system further comprises (f) at least one ceiling level fire protection sprinkler provided above the at least one first horizontal barrier and the at least one second horizontal barrier.

25. The rack and fire protection sprinkler system according to claim 24, wherein the at least one ceiling level sprinkler is one of (i) an extended coverage sprinkler, (ii) a special application sprinkler, (iii) an early suppression fast response sprinkler, (iv) a storage sprinkler, or (v) an extended coverage storage sprinkler.

26. The rack and fire protection sprinkler system according to claim 24, wherein the at least one first rack level sprinkler, the at least one second rack level sprinkler, and the at least one ceiling level sprinkler are the same type of sprinkler.

27. The rack and fire protection sprinkler system according to claim 24, wherein the K-factor of the at least one ceiling level sprinkler is about 11.2 gpm/$(psi)^{1/2}$ or greater.

28. The rack and fire protection sprinkler system according to claim 24, wherein the K-factor of the at least one ceiling level sprinkler is about 25 gpm/$(psi)^{1/2}$ or greater.

* * * * *